US011477443B2

United States Patent
Kim et al.

(10) Patent No.: US 11,477,443 B2
(45) Date of Patent: Oct. 18, 2022

(54) ELECTRONIC DEVICE FOR PERFORMING IMAGE COMPRESSION AND OPERATING METHOD OF ELECTRONIC DEVICE

(71) Applicant: Samsung Electronics Co., Ltd., Gyeonggi-do (KR)

(72) Inventors: Sungoh Kim, Gyeonggi-do (KR);
Youngjo Kim, Gyeonggi-do (KR);
Hyunhee Park, Gyeonggi-do (KR);
Arang Lee, Gyeonggi-do (KR);
Hyungju Chun, Gyeonggi-do (KR);
Jongbum Choi, Gyeonggi-do (KR);
Changsu Han, Gyeonggi-do (KR);
Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 17/057,760

(22) PCT Filed: Jun. 10, 2019

(86) PCT No.: PCT/KR2019/006927
§ 371 (c)(1),
(2) Date: Nov. 23, 2020

(87) PCT Pub. No.: WO2019/245204
PCT Pub. Date: Dec. 26, 2019

(65) Prior Publication Data
US 2021/0306624 A1    Sep. 30, 2021

(30) Foreign Application Priority Data

Jun. 19, 2018 (KR) .................. 10-2018-0070194

(51) Int. Cl.
*H04N 19/11* (2014.01)
*H04N 19/167* (2014.01)
(Continued)

(52) U.S. Cl.
CPC ......... *H04N 19/11* (2014.11); *H04N 5/23229* (2013.01); *H04N 19/167* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 11,134,270 B2 * | 9/2021 | Lim | ..................... H04N 19/597 |
| 2013/0147843 A1 * | 6/2013 | Shimizu | ............... H04N 13/161 |
| | | | 345/647 |

(Continued)

FOREIGN PATENT DOCUMENTS

| | | |
|---|---|---|
| JP | 2013-003756 A | 1/2013 |
| KR | 10-2011-0068375 A | 6/2011 |

(Continued)

*Primary Examiner* — Chikaodili E Anyikire
(74) *Attorney, Agent, or Firm* — Cha & Reiter, LLC

(57) ABSTRACT

Various embodiments provide an electronic device and a method for controlling an operation of the electronic device. An electronic device according to various embodiments of the present invention may comprise: a lens unit; an image sensor; a memory used for intra-prediction of an image captured using the image sensor, and storing direction modes differently configured according to characteristics of a partial area of the lens unit; and a processor, wherein the processor: acquires a raw image corresponding to an external object by using the image sensor; divides the raw image into multiple blocks; selects a block, on which intra-prediction is to be performed, from among the multiple blocks; determines a direction mode to be used for intra-prediction of the selected block on the basis of a distortion parameter of a partial area of the lens unit corresponding to the selected block; performs the intra-prediction on the selected block on the basis of the determined direction mode; and generates a compressed image corresponding to the raw image on the (Continued)

basis of a result of the intra-prediction. In addition, various embodiments are possible.

13 Claims, 17 Drawing Sheets

(51) Int. Cl.
*H04N 19/176* (2014.01)
*H04N 5/232* (2006.01)

(56) References Cited

U.S. PATENT DOCUMENTS

| | | |
|---|---|---|
| 2016/0073107 A1 | 3/2016 | Moon et al. |
| 2017/0134454 A1 | 5/2017 | Bae et al. |
| 2019/0191155 A1 | 6/2019 | Ko et al. |
| 2019/0208200 A1* | 7/2019 | Galpin ................. H04N 19/176 |
| 2019/0260989 A1* | 8/2019 | Racape ................. H04N 19/11 |
| 2019/0387212 A1* | 12/2019 | Oh ........................... G06T 5/006 |

FOREIGN PATENT DOCUMENTS

| | | |
|---|---|---|
| KR | 10-2014-0124448 A | 10/2014 |
| KR | 10-2016-0015125 A | 2/2016 |
| KR | 10-2018-0000303 A | 1/2018 |
| WO | 2017/093604 A1 | 6/2017 |
| WO | 2018/060358 A1 | 4/2018 |

\* cited by examiner

ELECTRONIC DEVICE FOR PERFORMING IMAGE COMPRESSION AND OPERATING METHOD OF ELECTRONIC DEVICE

CROSS-REFERENCE TO RELATED APPLICATION(S)

This application is a National Phase Entry of PCT International Application No. PCT/KR2019/006927, which was filed on Jun. 10, 2019 and claims priority to Korean Patent Application No. 10-2018-0070194, which was filed on Jun. 19, 2018, the contents of which are incorporated herein by reference.

TECHNICAL FIELD

Various embodiments of the disclosure relate to an electronic device for performing image compression and an operating method of an electronic device.

BACKGROUND ART

Demand for high-resolution and high-quality images, such as high-definition (HD) images and ultrahigh-definition (UHD) images, have been increasing in various fields. As image data has high resolution and high quality, the amount of data increases relative to legacy image data. Therefore, when image data is transmitted using a medium, such as a conventional wired/wireless broadband line, or is stored using an existing storage medium, transmission cost and storage cost thereof are increased.

Accordingly, extensive studies are ongoing on an image compression technique for high-resolution and high-quality images in order to address the foregoing problems due to image data having high resolution and high quality.

DISCLOSURE OF INVENTION

Technical Problem

Recently, a situation in which a high-quality image is captured and a captured image is transmitted may occur in various situations that have not been previously encountered, such as image capturing using a 360-degree camera or a drone. Lenses used for image capturing using a 360-degree camera or a drone may include a lens that entails significant image distortion.

When a lens used for image capturing is a fisheye lens or a wide-angle lens, an image that is distorted in a spherical shape as the distance from the center of the lens increases may be generated.

When performing intra-prediction included in an image compression process for an image captured using a lens entailing significant image distortion, a linear prediction method used for intra-prediction of a spherically distorted image may cause an increase in residual value generated through the intra-prediction. A residual value may mean the difference between the pixel value of a base pixel and the pixel value of each of reference pixels among remaining pixels other than the base pixel in intra-prediction. The increase in the residual value may reduce the efficiency of image compression.

Solution to Problem

An electronic device according to various embodiments of the disclosure may include: a lens unit; an image sensor; a memory configured to store a direction mode used for intra-prediction of an image captured using the image sensor and differently configured depending on a characteristic of a portion of the lens unit; and a processor, wherein the processor may be configured to: obtain a raw image corresponding to an external object using the image sensor; divide the raw image into a plurality of blocks; select a block to be subjected to intra-prediction from among the plurality of blocks; determine a direction mode to be used for intra-prediction of the selected block based on a distortion parameter of a portion of the lens unit corresponding to the selected block; perform the intra-prediction on the selected block based on the determined direction mode; and generate a compressed image corresponding to the raw image based on a result of the intra-prediction.

An electronic device according to various embodiments of the disclosure may include: a lens unit; an image sensor configured to be disposed such that an image circle, formed on a surface of the image sensor when light corresponding to an external object passes through the lens unit, partially includes a portion of the image sensor and does not include another portion of the image sensor; and a processor, wherein the processor may be configured to: obtain an image corresponding to the external object using the image sensor; determine a portion of the image corresponding to the image circle; generate compressed image data by dividing the image into a plurality of blocks and compressing the plurality of blocks, a block at least partially included in the image circle among the plurality of blocks being compressed as part of the compressed image data and a block not included in the image circle among the plurality of blocks not being included in the compressed image data in part of the compressing; and transmit the compressed image data to an external processor.

An operating method of an electronic device according to various embodiments of the disclosure may include: obtaining a raw image corresponding to an external object using an image sensor; dividing the raw image into a plurality of blocks; selecting a block to be subjected to intra-prediction from among the plurality of blocks; determining a direction mode to be used for intra-prediction of the selected block based on a distortion parameter of a portion of a lens unit corresponding to the selected block; performing the intra-prediction on the selected block based on the determined direction mode; and generating a compressed image corresponding to the raw image based on a result of the intra-prediction.

Advantageous Effects of Invention

An electronic device for performing image compression and an operating method of the electronic device according to various embodiments of the disclosure may perform compression on a block at least partially including an image circle among a plurality of blocks forming an image, thereby improving the speed of image compression.

An electronic device for performing image compression and an operating method of the electronic device according to various embodiments of the disclosure may use a prediction mode in view of the degree of distortion of a portion of a lens corresponding to a block to be subjected to intra-prediction, thereby reducing a residual value and increasing the efficiency of image compression.

An electronic device for performing image compression and an operating method of the electronic device according to various embodiments of the disclosure may transmit a compressed image to a cloud platform, and the cloud platform may perform image processing on the compressed image. Image processing may be performed by the cloud platform having superior processing performance to that of the electronic device, thereby achieving image processing at a high speed.

MODE FOR THE INVENTION

Figure 1:
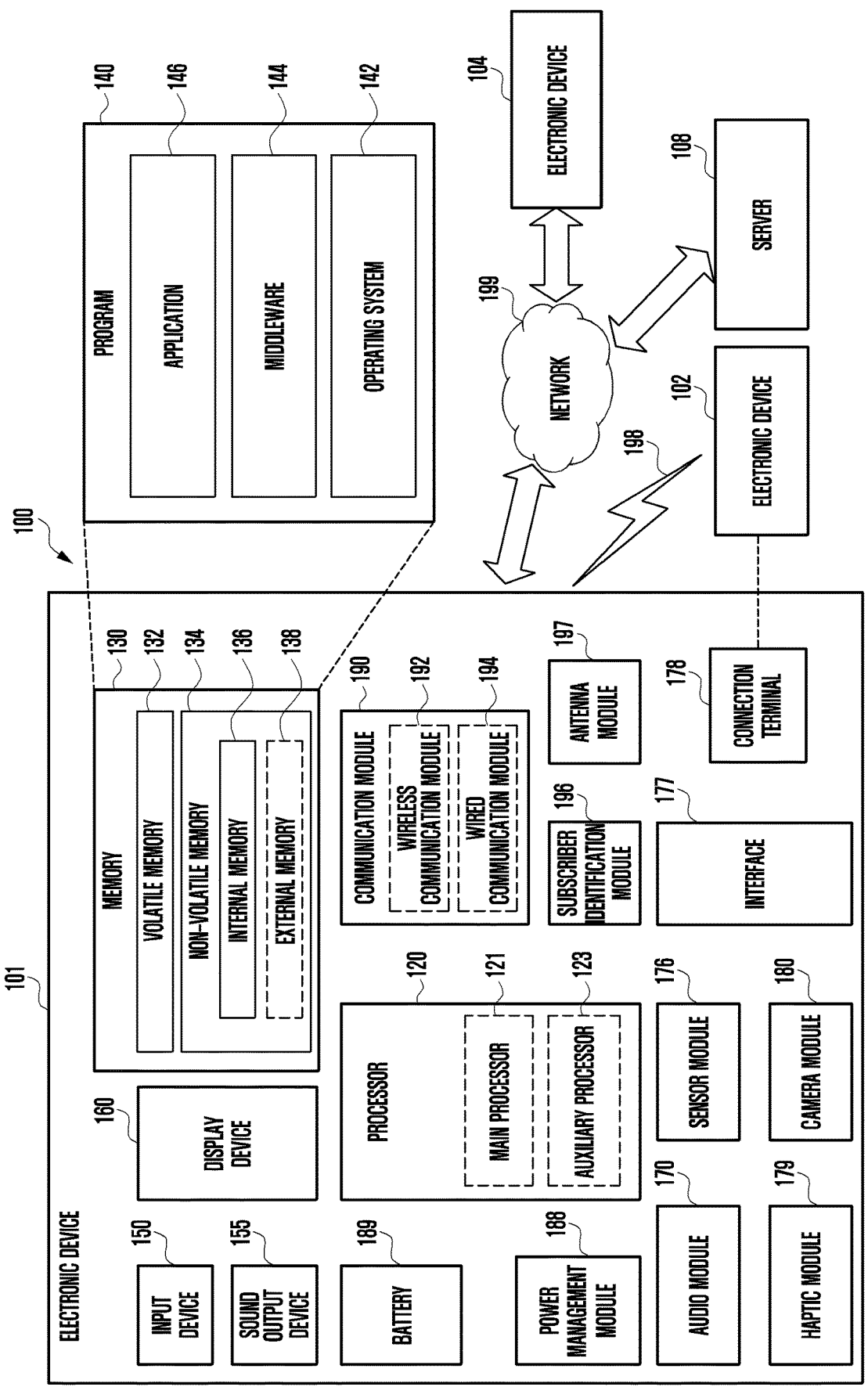
FIG. 1 is a block diagram illustrating an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
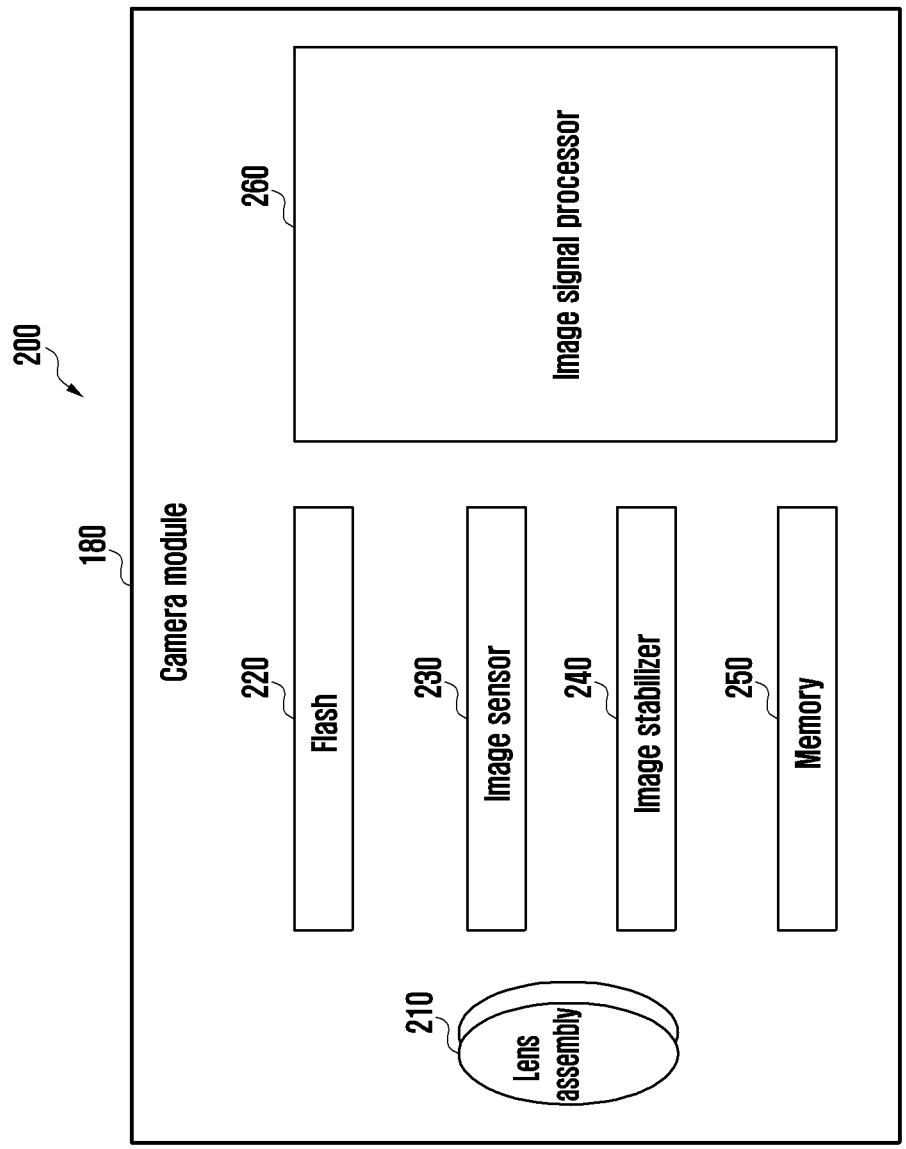
FIG. 2 is a block diagram illustrating a camera module of an electronic device according to various embodiments of the disclosure.

FIG. 2 is a block diagram 200 illustrating the camera module 180 according to various embodiments. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, autofocusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
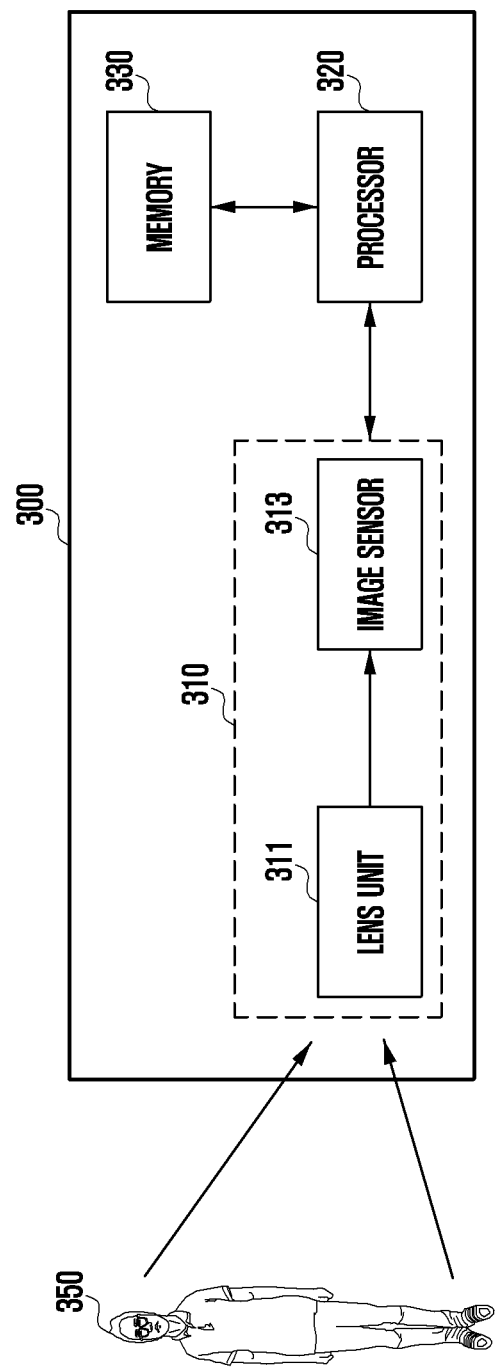
FIG. 3 is a block diagram illustrating an electronic device according to various embodiments of the disclosure.

FIG. 3 is a block diagram illustrating an electronic device according to various embodiments of the disclosure.

Referring to FIG. 3, the electronic device 300 (e.g., the electronic device 101 of FIG. 1) according to various embodiments of the disclosure may include a camera module 310 including a lens unit 311 (e.g., the lens assembly 210 of FIG. 2) and an image sensor 313 (e.g., the image sensor 230 of FIG. 2), a processor 320 (e.g., the processor 120 of FIG. 1), and a memory 330 (e.g., FIG. 1 memory 130).

According to various embodiments of the disclosure, the camera module 310 may generate an image using light emitted from an external object 350 to be photographed. The camera module 310 may capture both a still image and a video but is not limited thereto.

According to various embodiments of the disclosure, the lens unit 311 may collect light emitted from the external object 350. The lens unit 311 may include a plurality of lenses and may include various lenses, such as a wide-angle lens, a narrow-angle lens, and a fisheye lens.

According to various embodiments of the disclosure, the image sensor 313 may convert the light collected by the lens unit 311 into an electrical signal, thereby obtaining an image corresponding to the external object 350. The image generated by the image sensor 313 may be a raw image.

According to various embodiments of the disclosure, the image sensor 313 may be disposed such that an image circle formed on the surface of the image sensor 313 by passing light corresponding to the external object 350 through the lens unit 311 is included in part of the image sensor 313 and is not included in another part of the image sensor 313. The image circle may refer to a virtual line realized in a circle on the image. The shape of the image circle may be a circle but may have various shapes without being limited to a circle.

According to various embodiments of the disclosure, a raw image may be configured in various formats (e.g., a Bayer format). The raw image may be expressed in one color of red (R), green (G), and blue (B) for a pixel of the image sensor 313 and can be expressed in a bit depth of 8 to 16 bits. Various color filter array (CFA) patterns may be applied to the raw image. The raw image may be a raw image in a layer structure including information about various colors (e.g., a plurality of colors among R, G, and B) for one pixel. In addition to color information (e.g., RGB), phase difference information may also be included according to various configurations of the image sensor 313. Information related to image capturing (e.g., time, location, illuminance, and the like) may be generated as metadata and may be stored in relation to the raw image.

According to various embodiments of the disclosure, a raw image may refer to an image generated by the image sensor 313, which is an image that has not been subjected to image compression. As resolution supportable by the camera module 310 increases, the size of a raw image may increase. When the size of the raw image increases, the time required for image processing for the raw image may increase. There is a need for a technique for efficiently compressing a raw image while reducing the size of the raw image and substantially maintaining the quality of the raw image.

According to various embodiments of the disclosure, in order to efficiently compress a raw image, a plurality of blocks forming the raw image may be divided into blocks to be compressed and blocks not to be compressed.

According to various embodiments of the disclosure, in order to efficiently compress a raw image, a plurality of straight lines included in a direction mode used for intra-prediction of the raw image may be changed into a curved line having a curvature. The curvature may be determined based on a distortion parameter of the raw image caused by characteristics of a lens optical system. Hereinafter, a description of efficiently compressing a raw image will be described.

According to various embodiments of the disclosure, the processor 320 may obtain an image corresponding to the external object 350 using the image sensor 313. The image corresponding to the external object 350 may be a raw image, which has not yet been compressed.

According to various embodiments of the disclosure, the processor 320 may determine a portion of the image corresponding to an image circle. The image circle may refer to a virtual line realized in a circle on the image. The image circle may have a circular shape but may have various shapes without being limited to a circular shape. The processor 320 may compress blocks included in the image circle among a plurality of blocks included in the image.

According to various embodiments of the disclosure, the processor 320 may not compress blocks not included in the image circle among the plurality of blocks included in the image. The blocks not included in the image circle may not be used for image processing. To this end, the processor 320 may set a pixel value allocated to each block not included in the image circle to 0. The image circle will be described later with reference to FIG. 4A and FIG. 4B.

According to various embodiments of the disclosure, the processor 320 may compress a plurality of blocks included in the image. Image compression methods may be divided into inter-prediction and intra-prediction.

According to various embodiments of the disclosure, inter-prediction may refer to a technique of predicting the value of a pixel included in a current frame from a frame preceding the current frame or a frame following the current frame among a plurality of frames included in a video.

According to various embodiments of the disclosure, intra-prediction may refer to a technique of predicting the value of a pixel included in an image using information about a pixel in the image. In order to perform intra-prediction, the memory 350 may store a direction mode used for the intra-prediction. The memory 350 may store a direction mode differently configured depending on a distortion parameter of the lens unit 311. The distortion parameter may refer to a degree to which a portion of a lens is distorted due to optical characteristics of a lens assembly (e.g., the lens assembly 210 of FIG. 2) included in the lens unit 311. For example, as the value of the distortion parameter increases, the distortion of a portion of the lens unit 311 corresponding to the distortion parameter may increase.

According to various embodiments of the disclosure, in order to minimize a residual value, which is the difference between the pixel value of a base pixel and the pixel value of each of reference pixels among remaining pixels other than the base pixel, the processor 320 may perform intra-prediction in each of a plurality of directions included in the direction mode. The processor 320 may select a direction in which the residual value is a minimum value from among the plurality of directions included in the direction mode and may perform image compression using the selected direction.

According to various embodiments of the disclosure, a portion of the image obtained by photographing the external object 350 may be distorted due to characteristics of the lens unit 311.

For example, a portion of the image may be distorted due to the difference between the refractive index of the center of the lens unit 311 and the refractive index of an outer portion of the lens unit 311. When the lens unit 311 includes a wide-angle lens, the degree of distortion of an image portion corresponding to the outer portion of the lens unit 311 may be greater than the degree of distortion of an image portion corresponding to a center portion of the lens unit 311. The image portion corresponding to the outer portion of the lens unit 311 may be distorted in a spherical shape, and when intra-prediction of the image portion corresponding to the outer portion of the lens unit 311 is performed using a direction mode used for intra-prediction of the image portion corresponding to the center portion of the lens unit 311, a residual value may increase. When the residual value increases, the size of a compressed image may increase and compression efficiency may decrease.

According to various embodiments of the disclosure, the memory 350 may store a plurality of direction modes designated for each distortion parameter value indicating the degree of distortion. The plurality of direction modes may include lines having different curvatures corresponding to a distortion parameter. The curvature may be determined based on the distortion parameter of a raw image. The curvatures of lines included in a direction mode corresponding to a distortion parameter indicating that great distortion occurs may be greater than the curvatures of lines included in a direction mode corresponding to a distortion parameter indicating that small distortion occurs.

According to various embodiments of the disclosure, a different distortion parameter may be determined for each portion of a lens according to optical characteristics of the portion of the lens. Some portions of the lens unit 311 may have different distortion parameters. For example, the outer portion of the lens unit 311 may have different optical characteristics from those of the center region of the lens unit 311. The center portion of the lens unit 311 may have a different distortion parameter from that of the outer portion of the lens unit 311. A distortion parameter may be determined based on the distance between the center of the lens unit 311 and a portion corresponding to the distortion parameter. A distortion parameter may be measured by a manufacturer at the time of manufacturing the lens unit 311, and the measured distortion parameter may be included in information about the lens unit 311 and may be stored in the memory 350.

According to various embodiments of the disclosure, a direction mode may be configured such that the curvatures of lines included in the direction mode varies according to the distance between the center of the lens unit 311 and a portion of the lens unit 311.

For example, when the lens unit 311 includes a lens (e.g., a lens having a great field of view (FOV, e.g., a lens having an FOV of 120 degree or greater), a telephoto lens, or a fisheye lens) in which a significant distortion phenomenon occurs as the distance from the center of the lens unit 311 increases, the direction mode may be configured such that the curvatures of the lines included in the direction mode increase as the distance between the center of the lens unit 311 and the portion of the lens unit 311 increases.

According to various embodiments of the disclosure, the processor 320 may select a block to be subjected to intra-prediction from among the plurality of blocks included in the image. The block to be subjected to intra-prediction may be one of the blocks included in the image circle.

According to various embodiments of the disclosure, the processor 320 may identify a portion of the lens unit 311 corresponding to the selected block and may determine a direction mode to be used for intra-prediction of the selected block among the direction modes stored in the memory 350 based on a distortion parameter corresponding to the portion of the lens unit 311.

According to various embodiments of the disclosure, the processor 320 may perform intra-prediction on the selected block using the determined direction mode. The processor 320 may determine a direction in which compression to minimize a residual value is performed by performing the intra-prediction. The processor 320 may compress the image based on an intra-prediction result and may generate a compressed image.

According to various embodiments of the disclosure, the electronic device 300 may divide the plurality of blocks forming the raw image into blocks to be compressed and blocks not to be compressed, may compress only the blocks to be compressed, and may not perform image processing on the blocks not to be compressed, thereby reducing the size of the compressed image.

According to various embodiments of the disclosure, the electronic device 300 may divide the plurality of blocks forming the raw image into the blocks to be compressed and the blocks not to be compressed in order to efficiently compress the raw image.

According to various embodiments of the disclosure, the processor 320 may identify a distortion parameter corresponding to the block to be subjected to intra-prediction among the plurality of blocks included in the image. The processor 320 may determine a direction mode corresponding to the distortion parameter and may perform intra-prediction using the determined direction mode. The processor 320 may reduce a residual value and may perform efficient compression by employing the direction mode in consideration of the degree of distortion of a lens.

According to various embodiments of the disclosure, the electronic device 300 may further include a communication module (e.g., the communication module 190 of FIG. 1) to transmit the compressed image to an external electronic device (e.g., the electronic device 104 of FIG. 1). The processor 320 may transmit the compressed image to the external electronic device 104 using the communication module 190. The external electronic device 104 may receive the compressed image and may perform various types of image processing on the compressed image. The image which has been subjected to image processing may be transmitted to the electronic device 300 through the communication module 190.

Figure 4A:
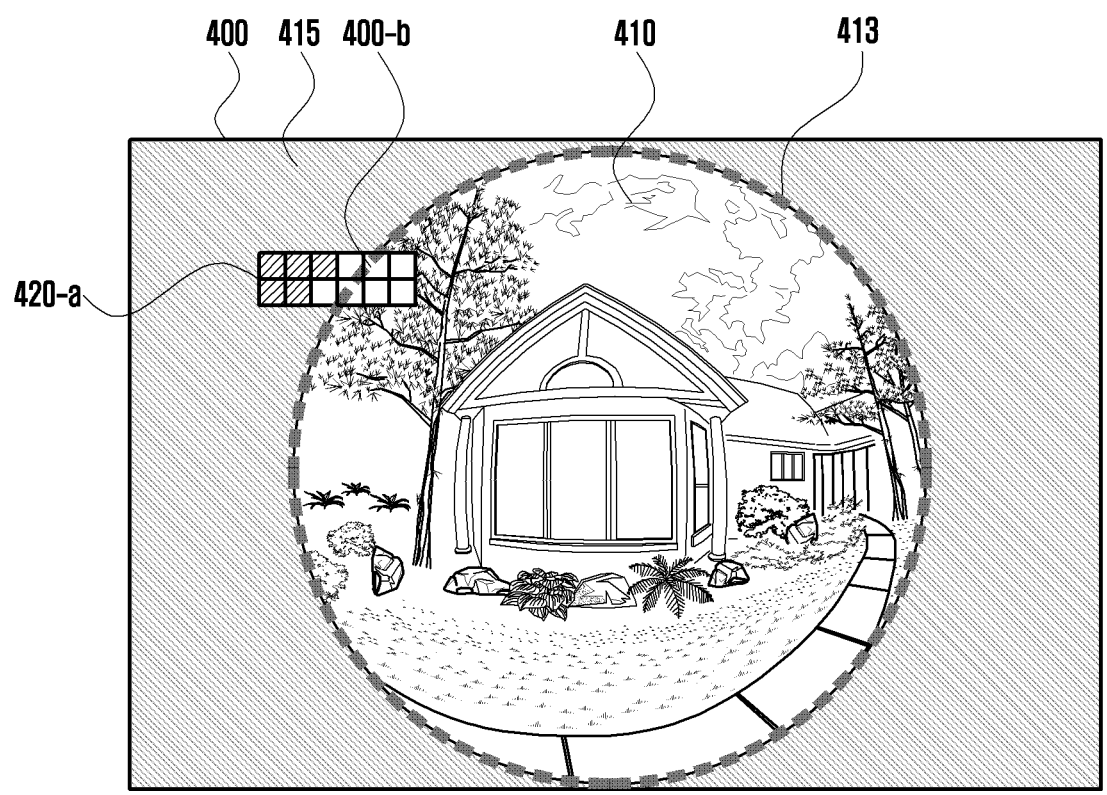
FIG. 4A and FIG. 4B illustrate an embodiment in which an electronic device according to various embodiments of the disclosure determines a block to be compressed in an obtained image.
Figure 4B:
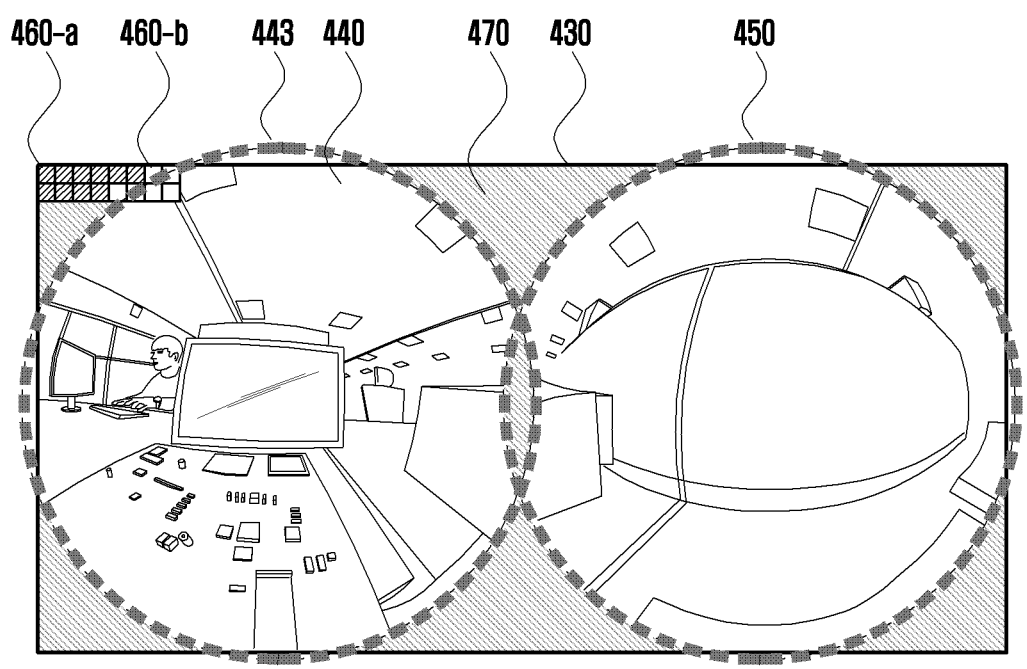

FIG. 4A and FIG. 4B illustrate an embodiment in which an electronic device according to various embodiments of the disclosure determines a block to be compressed in an obtained image.

FIG. 4A illustrates an image 400 captured by an image sensor 313 of an electronic device 300 according to various embodiments of the disclosure using a lens unit 311 configured with a fisheye lens.

Referring to FIG. 4A, the image 400 may include a first portion 410 captured in a spherical shape and a second portion 415 existing outside the first portion 410. The first portion 410 may include important information including an external object, and the second portion 415 may not include important information included in the image and may be a portion that may be omitted.

According to various embodiments of the disclosure, the image 400 may be a raw image generated by an image sensor (e.g., the image sensor 313 of FIG. 3).

According to various embodiments of the disclosure, a processor (e.g., the processor 320 of FIG. 3) may identify a portion of the image 400 corresponding to an image circle 413. The image circle 413 may refer to an area formed by light passing through a lens unit (e.g., the lens unit 311 of FIG. 3). The image circle 413 may include the first portion 410 and may not include the second portion 415. Alternatively, the image circle 413 may have the same size as the first portion 410. The image circle 413 is formed in a circular shape in FIG. 4A but may also be formed in a different shape other than a circular shape depending on the shape of a lens.

According to various embodiments of the disclosure, the processor 320 may determine a block to be compressed. The processor 320 may determine to compress a block 420-*b* at least partially including a portion included in the image circle 413.

According to various embodiments of the disclosure, the processor 320 may determine a block not to be compressed. The processor 320 may determine not to compress a block 420-*a* including a portion not included in the image circle 413. The processor 320 may determine not to compress the block 420-*a* including the portion not included in the image circle 413 and may not include the portion in a compressed image.

According to various embodiments of the disclosure, the processor 320 may compress a block included in the image circle 413 and may not compress a block not included in the image circle 413, thereby reducing time required for compression.

FIG. 4B illustrates an image 430 captured by an image sensor 313 of an electronic device 300 according to various embodiments of the disclosure using a lens unit 311 configured with two fisheye lenses.

Referring to FIG. 4B, the image 430 may include a first portion 440 captured in a spherical shape, a second portion 450, and a third portion 470 existing outside the first portion 440 and the second portion 450. The first portion 440 and the second portion 450 may include important information including an external object, and the third portion 470 may not include important information (e.g., an external object) included in the image and may be a portion that may be omitted.

According to various embodiments of the disclosure, the image 430 may be a raw image generated by the image sensor (e.g., the image sensor 313 of FIG. 3).

According to various embodiments of the disclosure, the processor (e.g., the processor 320 of FIG. 3) may identify a portion of the image 430 corresponding to an image circle 443.

According to various embodiments of the disclosure, the processor 320 may determine a block to be compressed. The processor 320 may determine to compress a block 460-b at least partially including a portion included in the image circle 443.

According to various embodiments of the disclosure, the processor 320 may determine a block not to be compressed. The processor 320 may determine not to compress a block 460-a including a portion not included in the image circle 443. The processor 320 may determine not to compress the block 460-a including the portion not included in the image circle 443 and may not include the portion in a compressed image.

According to various embodiments of the disclosure, the processor 320 may compress a block included in the image circle 443 and may not compress a block not included in the image circle 443, thereby reducing time required for compression.

Figure 5A:
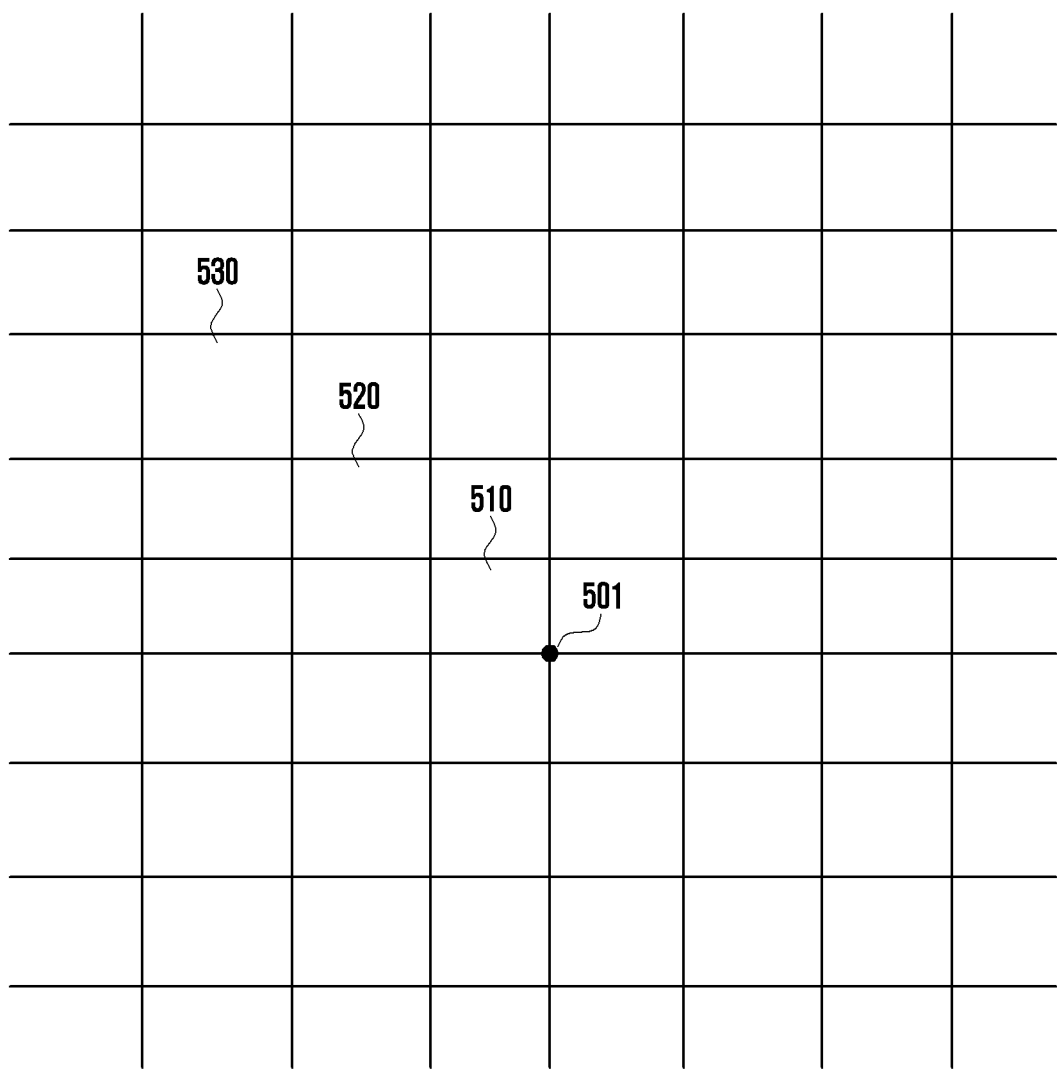
FIG. 5A and FIG. 5B illustrate an embodiment in which an electronic device according to various embodiments of the disclosure determines a distortion parameter of a lens.
Figure 5B:
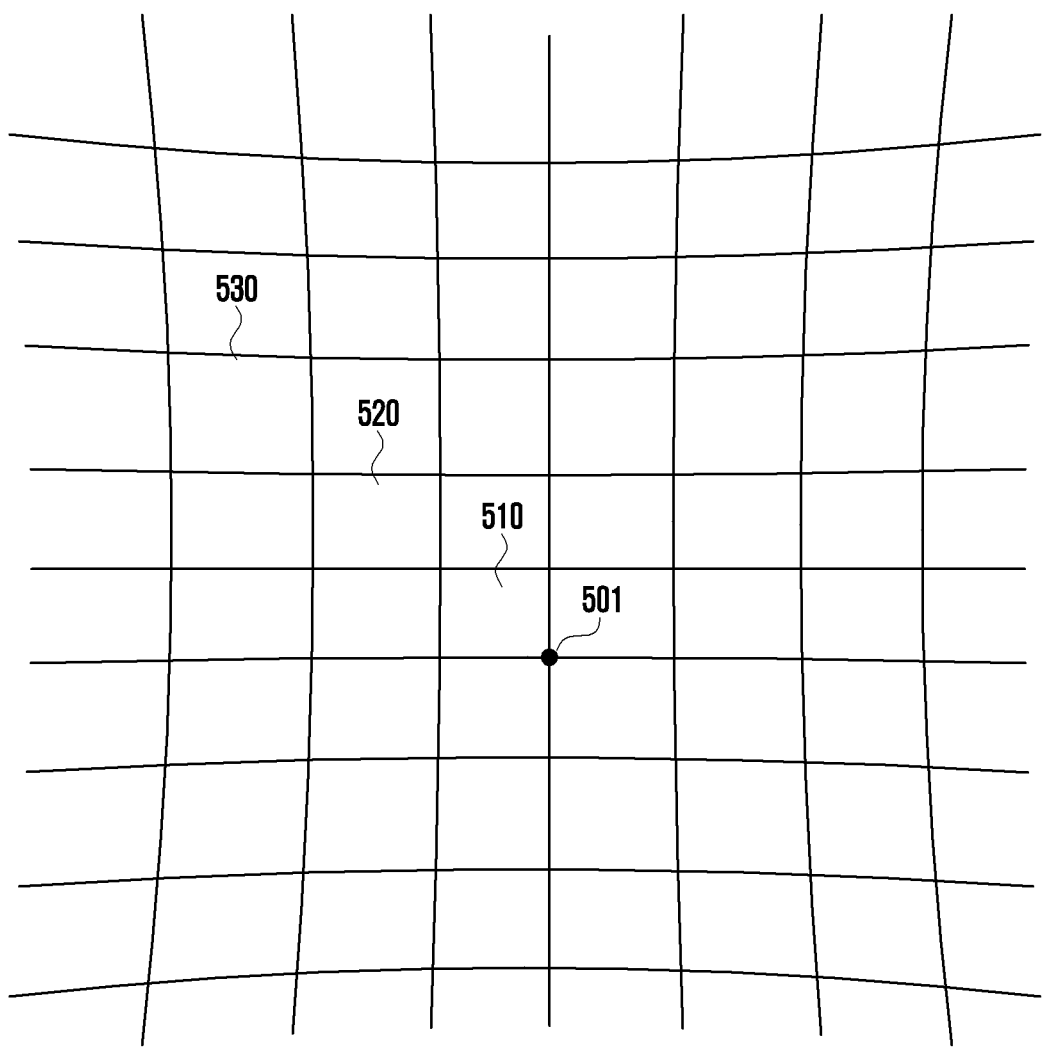

FIG. 5A and FIG. 5B illustrate an embodiment in which an electronic device according to various embodiments of the disclosure determines a distortion parameter of a lens.

FIG. 5A illustrates a pattern 500 for determining a distortion parameter of a lens unit (e.g., the lens unit 311 of FIG. 3), and FIG. 5B illustrates an image 540 obtained by an image sensor (e.g., the image sensor 313 of FIG. 3) using light that is reflected on the pattern 500 illustrated in FIG. 5A and passes through the lens unit 311.

Referring to FIG. 5A, the pattern 500 may include straight lines. The pattern 500 may be divided into a plurality of blocks by the straight lines and may include a first block 510, a second block 520, and a third block 530.

According to various embodiments of the disclosure, the image sensor 313 may convert light collected by the lens unit 311 into an electrical signal, thereby obtaining the image 540 corresponding to the pattern 500.

According to various embodiments of the disclosure, the lens unit 311 may allow a distorted image to be obtained depending on optical characteristics (various characteristics including a viewing angle, a refractive index, or a distortion value). The lens unit 311 may have different degrees of distortion depending on positions on a lens included in the lens unit 311.

For example, when the lens unit 311 includes a wide-angle lens, the degree of distortion of an image portion corresponding to an outer portion of the lens unit 311 may be greater than the degree of distortion of an image portion corresponding to a center portion of the lens unit 311.

Referring to FIG. 5B, the longer the distance from the center portion 501 of the lens unit 311 is, the more greatly the image 540 may be distorted. The first block 510, the second block 530, and the third block 540 may be disposed in order at positions increasingly distant from the center portion 501, the third block 530 may have the greatest distortion, and the second block 520 may have greater distortion than the first block 510.

According to various embodiments of the disclosure, at least one block included in the image 540 may be allocated a distortion parameter. A distortion parameter may be a parameter indicating the degree of distortion of a block. For example, the larger a distortion parameter is, the more greatly a block may be distorted.

According to various embodiments of the disclosure, the distortion parameter may be determined by various methods for indicating the degree of distortion of a block. For example, the curvature of one line forming the block may be calculated, and the distortion parameter may be determined according to the size of the curvature. In another example, a change in the area of the block may be calculated, and the distortion parameter may be determined according to the change in the area of the block.

According to various embodiments of the disclosure, a different distortion parameter may be determined for each separate portion of the lens. Each separate portion of the lens unit 311 may have a different distortion parameter. For example, a distortion parameter of the center portion of the lens unit 311 may be different from a distortion parameter of the outer portion of the lens unit 311. A distortion parameter may be determined based on the distance between the center of the lens unit 311 and a portion corresponding to the distortion parameter. A distortion parameter may be measured by a manufacturer at the time of manufacturing the lens unit 311, and the measured distortion parameter may be included in information about the lens unit 311 and may be stored in a memory 350.

Figure 5C:
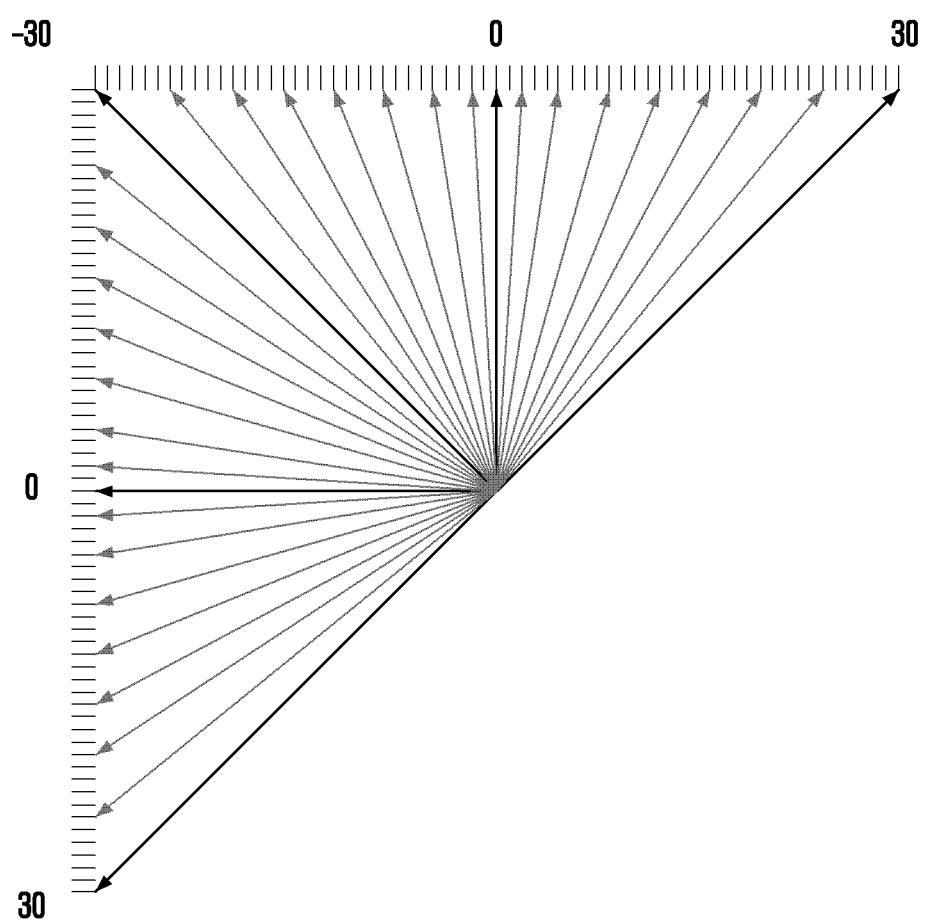
FIG. 5C to FIG. 5H illustrate a direction mode used to perform intra-prediction by an electronic device according to various embodiments of the disclosure.
Figure 5D:
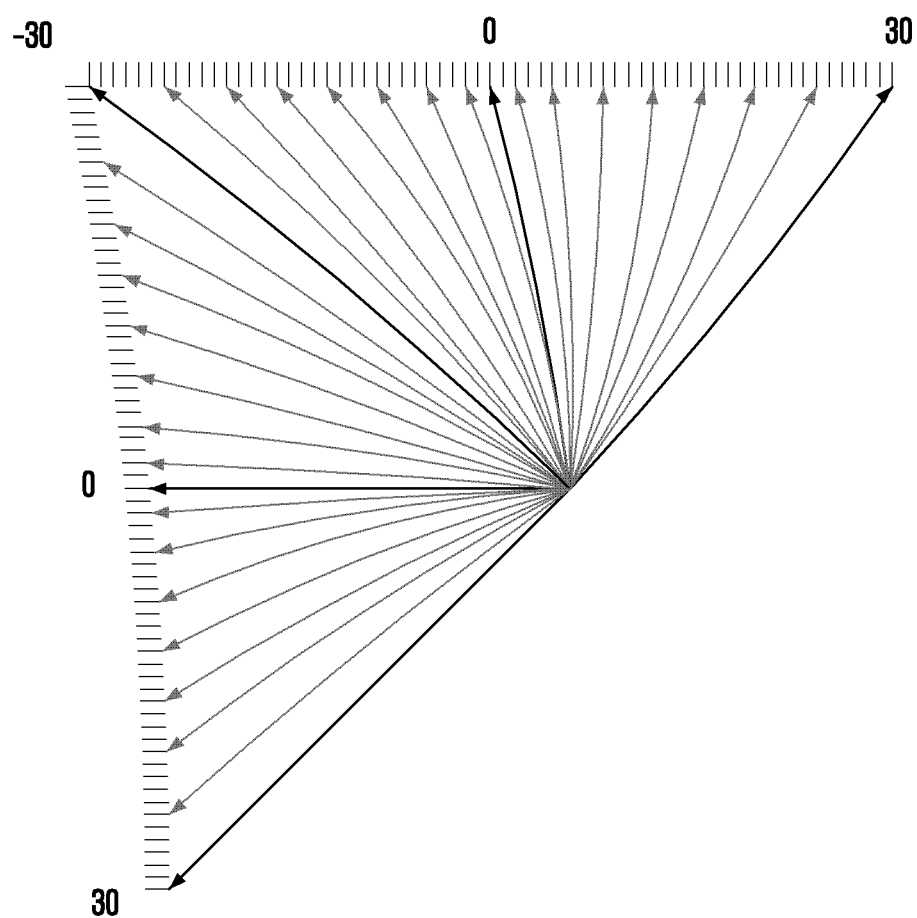
Figure 5E:
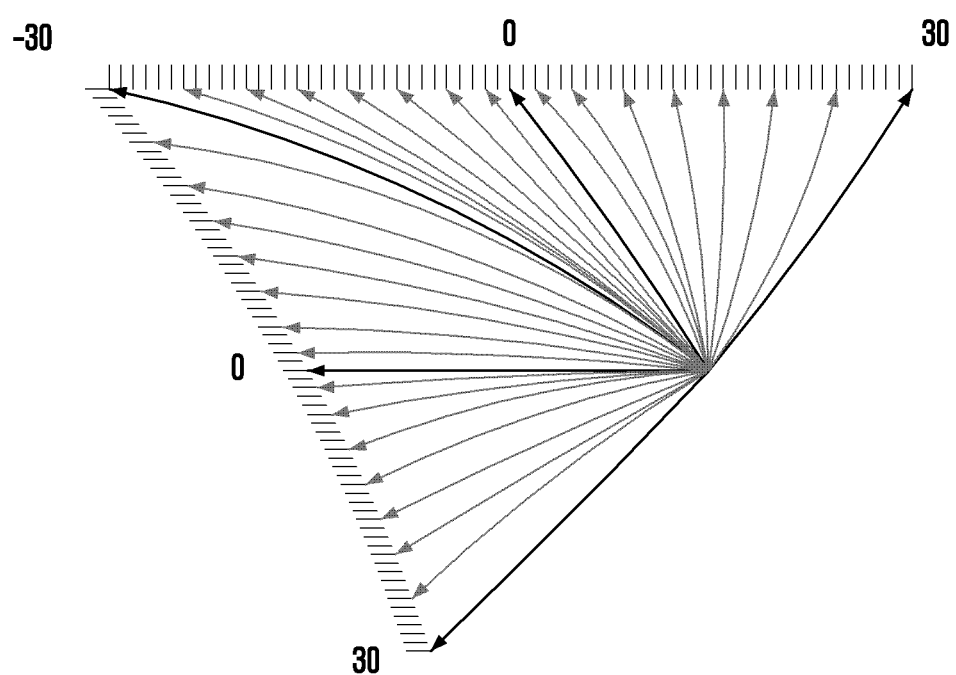

FIG. 5C to FIG. 5E illustrate a direction mode used to perform intra-prediction by an electronic device according to various embodiments of the disclosure.

According to various embodiments of the disclosure, when performing intra-prediction on blocks included in an image (e.g., the image 540 of FIG. 5B), a processor (e.g., the processor 320 of FIG. 3) may perform intra-prediction using different direction modes based on distortion parameters corresponding to the respective blocks.

According to various embodiments of the disclosure, the processor 320 may divide the image into a plurality of blocks and may select a block to be subjected to intra-prediction. The processor 320 may identify a distortion parameter of a portion of a lens unit 311 corresponding to the selected block. The processor 320 may determine a direction mode corresponding to the identified distortion parameter and may perform intra-prediction on the selected block using the determined direction mode.

FIG. 5C to FIG. 5E illustrate various direction modes stored in a memory (e.g., the memory 350 of FIG. 3).

FIG. 5C illustrates a first direction mode 550 used for intra-prediction of a first block 510. Referring to FIG. 5C, the first direction mode 550 used for the intra-prediction may include a plurality of straight lines having a specific direction or angle.

According to various embodiments of the disclosure, the processor 320 may use the first direction mode 550 when performing intra-prediction on the first block 510, which is a block in which distortion hardly occurs. The processor 320 may perform the intra-prediction in directions indicated by 33 straight lines (33 directional modes) included in the first direction mode 550, may perform the intra-prediction using non-directional modes (DC mode and planner mode), and may determine one mode in which a residual value is the smallest among the 35 modes included in the first direction mode 550. The processor 320 may perform image compression on the first block 510 using the determined mode.

FIG. 5D illustrates a second direction mode 560 used for intra-prediction of a second block 520. Referring to FIG. 5D, the second direction mode 560 used for the intra-prediction may include curved lines having a specific curvature. In the second block 520, the degree of distortion of the image may be great compared to that in the first block 510 due to the difference in optical characteristics between a portion of the lens corresponding to the second block 520 and a portion of the lens corresponding to the first block 510. A distortion parameter corresponding to the second block 520 may be greater than a distortion parameter corresponding to the first block 510. When distortion of the image occurs, a residual value may be great in intra-prediction mode using a straight line. According to various embodiments of the disclosure, the processor 320 may perform intra-prediction on a distorted block using a direction mode including curved lines, thus obtaining a compressed image with a reduced residual value.

According to various embodiments of the disclosure, the processor 320 may use the second direction mode 560 when performing intra-prediction on the second block 520, which is a block having greater distortion than the first block 510. The processor 320 may perform the intra-prediction in directions indicated by 33 curved lines (33 directional modes) included in the second direction mode 560, may perform the intra-prediction using non-directional modes (DC mode and planner mode), and may determine one mode in which a residual value is the smallest among the 35 modes included in the second direction mode 560. The processor 320 may perform image compression on the second block 520 using the determined mode.

FIG. 5E illustrates a third direction mode 570 used for intra-prediction of a second block 530. Referring to FIG. 5E, the third direction mode 570 used for the intra-prediction may include curved lines having a specific curvature. In the third block 530, the degree of distortion of the image may be great compared to that in the first block 510 and that in the second block 520. A distortion parameter corresponding to the third block 530 may be greater than the distortion parameter corresponding to the second block 520 and the distortion parameter corresponding to the first block 510.

Comparing the second direction mode 560 illustrated in FIG. 5D and the third direction mode 570 illustrated in FIG. 5E, the curvatures of the curved lines included in the third direction mode 570 are greater than the curvatures of the curved lines included in the second direction mode 560. According to various embodiments of the disclosure, a direction mode may be configured such that the curvatures of lines included in the direction mode vary according to the distance between the center of the lens unit 311 and a portion of the lens unit 311. For example, when the lens unit 311 includes a lens (e.g., a lens having a great field of view (FOV, e.g., a lens having an FOV of 120 degree or greater), a telephoto lens, or a fisheye lens) in which a significant distortion phenomenon occurs as the distance from the center of the lens unit 311 increases, the direction mode may be configured such that the curvatures of the lines included in the direction mode increase as the distance between the center of the lens unit 311 and the portion of the lens unit 311 increases.

According to various embodiments of the disclosure, the processor 320 may use the third direction mode 570 when performing intra-prediction on the third block 530. The processor 320 may perform the intra-prediction in directions indicated by 33 straight lines (33 directional modes) included in the third direction mode 570, may perform the intra-prediction using non-directional modes (DC mode and planner mode), and may determine one mode in which a residual value is the smallest among the 35 modes included in the third direction mode 570. The processor 320 may perform image compression on the third block 530 using the determined mode.

According to various embodiments of the disclosure, the curvatures of lines included in a direction mode may be determined based on the degree of distortion. The curvatures of lines included in a direction mode used for intra-prediction of a block having a great degree of distortion may be greater than those for other blocks.

Although the direction modes illustrated in FIG. 5C to FIG. 5E include 33 directional modes, the disclosure is not limited thereto. The number of directional modes may be adjusted in view of the performance of the electronic device 300.

Figure 5F:
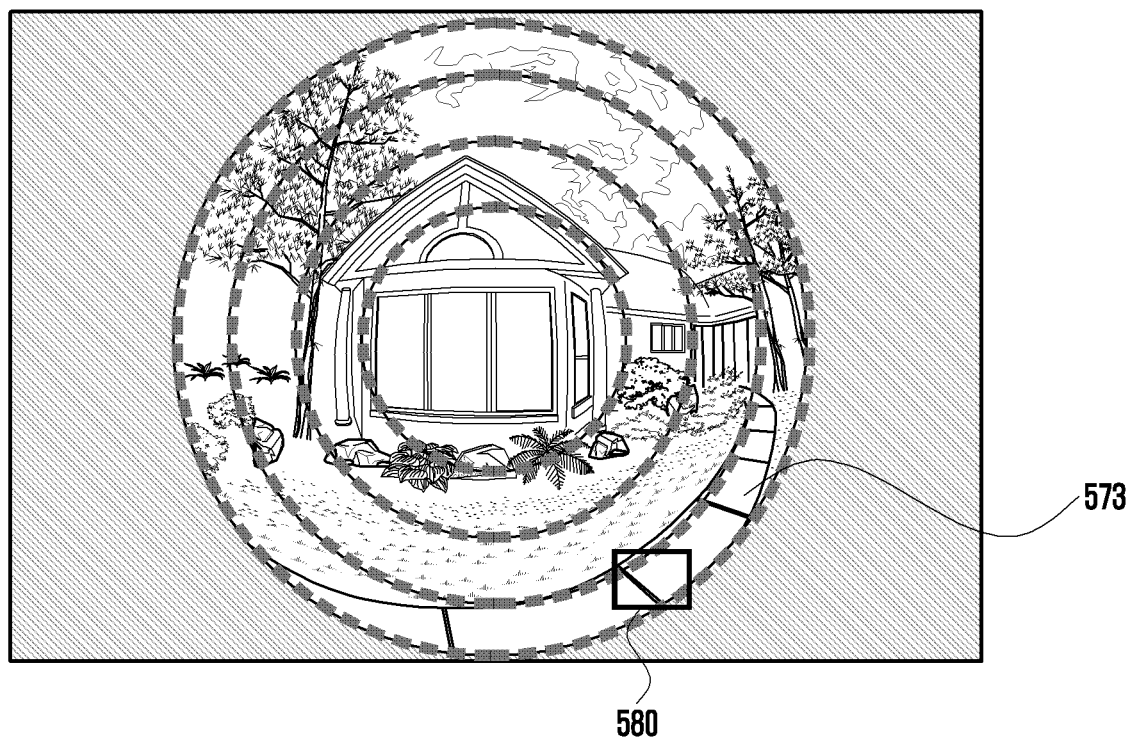
Figure 5G:
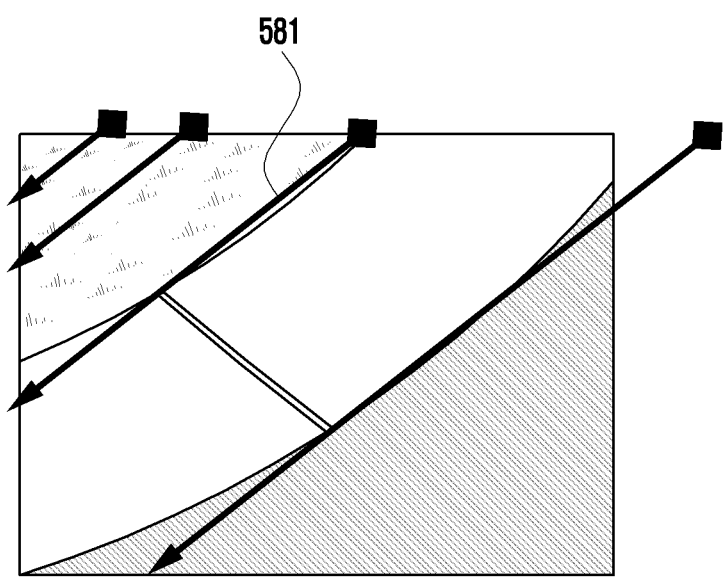
Figure 5H:
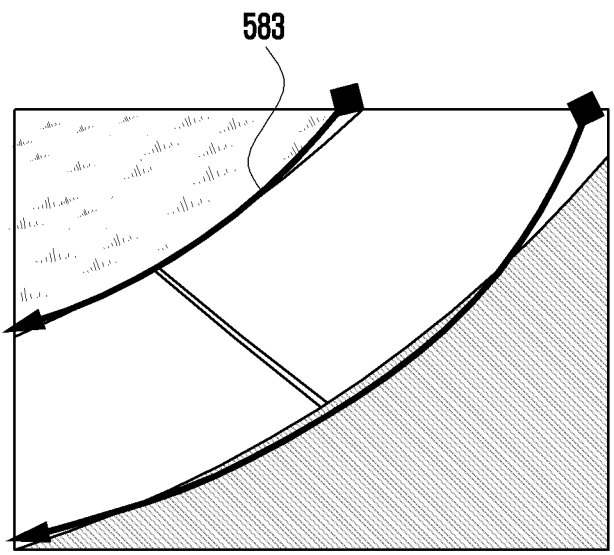

FIG. 5F to FIG. 5H illustrate an embodiment in which an electronic device according to various embodiments of the disclosure performs intra-prediction using a direction mode in view of a distortion parameter.

FIG. 5F illustrates an image captured by the image sensor 313 of the electronic device 300 according to various embodiments of the disclosure using the lens unit 311 configured with a fisheye lens. The image captured using the lens unit 311 configured with the fisheye lens may have greater distortion as the distance from the center of the lens unit 311 increases. For example, although a road 573 included in the image is formed in a straight line, the road 573 is photographed by the outer portion of the lens unit 311 and is thus seen to be distorted in a spherical shape.

FIG. 5G and FIG. 5H illustrate an embodiment of performing intra-prediction on one block 580 included in the image shown in FIG. 5F.

According to various embodiments of the disclosure, the processor (e.g., the processor 320 of FIG. 3) may perform intra-prediction on the block 580 in which great image distortion occurs. A conventional intra-prediction method using a linear direction is illustrated in FIG. 5G, and an intra-prediction method in view of intra-distortion according to various embodiments of the disclosure is illustrated in FIG. 5H.

As illustrated in FIG. 5G, in the intra-prediction method performed in a linear direction 581, dissimilar pixels may be compared, thus increasing a residual value. However, as illustrated in FIG. 5H, in the intra-prediction method performed in a curved direction 583 in view of intra-distortion, similar pixels may be compared, thus reducing a residual value.

An electronic device according to various embodiments of the disclosure may include: a lens unit; an image sensor; a memory configured to store a direction mode used for intra-prediction of an image captured using the image sensor and differently configured depending on a characteristic of a portion of the lens unit; and a processor, wherein the processor may be configured to: obtain a raw image corresponding to an external object using the image sensor; divide the raw image into a plurality of blocks; select a block to be subjected to intra-prediction from among the plurality of blocks; determine a direction mode to be used for intra-prediction of the selected block based on a distortion parameter of a portion of the lens unit corresponding to the selected block; perform the intra-prediction on the selected block based on the determined direction mode; and generate a compressed image corresponding to the raw image based on a result of the intra-prediction.

According to various embodiments of the disclosure, the processor may be configured to: determine the portion of the lens unit corresponding to the selected block based on information about a relative position between the selected block and a center of the raw image; select a direction mode corresponding to the determined portion; and perform the intra-prediction on the selected block based on the selected direction mode.

According to various embodiments of the disclosure, the processor may be configured to: select one direction from among a plurality of directions included in the selected direction mode based on a difference between a pixel value corresponding to a base pixel among pixels included in the selected block and a pixel value corresponding to a reference pixel present around the base pixel; and perform the intra-prediction on the selected block using the selected direction.

According to various embodiments of the disclosure, the direction mode may be configured such that a curvature of a line included in the direction mode varies depending on the distortion parameter.

According to various embodiments of the disclosure, the direction mode may be configured such that a curvature of a line included in the direction mode varies depending on a distance between a center of the lens unit and a center of the portion of the lens unit.

According to various embodiments of the disclosure, the lens unit may include a telephoto lens, and a curvature of a line included in the direction mode may be configured to increase when a distance between a center of the lens unit and a center of the portion of the lens unit increases.

According to various embodiments of the disclosure, the electronic device may further include: a communication module configured to transmit the compressed image to an external electronic device, wherein the electronic device may be configured to receive, using the communication module, an image generated by the external electronic device performing image processing on the compressed image.

An electronic device according to various embodiments of the disclosure may include: a lens unit; an image sensor configured to be disposed such that an image circle, formed on a surface of the image sensor when light corresponding to an external object passes through the lens unit, partially includes a portion of the image sensor and does not include another portion of the image sensor; and a processor, wherein the processor may be configured to: obtain an image corresponding to the external object using the image sensor; determine a portion of the image corresponding to the image circle; generate compressed image data by dividing the image into a plurality of blocks and compressing the plurality of blocks, a block at least partially included in the image circle among the plurality of blocks being compressed as part of the compressed image data and a block not included in the image circle among the plurality of blocks not being included in the compressed image data in part of the compressing; and transmit the compressed image data to an external processor.

According to various embodiments of the disclosure, in part of the compressing, the processor may be configured to: determine a distortion parameter based on a first block at least partially included in the image circle and a center of the image circle; perform intra-prediction on pixel data included in the first block using the distortion parameter; and compress the first block based on the intra-prediction.

According to various embodiments of the disclosure, the processor may be configured to perform the intra-prediction using a specified intra-prediction angular mode and the distortion parameter.

According to various embodiments of the disclosure, the processor may be configured to determine the distortion parameter based on an angle formed between at least two apexes of the first block and the center.

According to various embodiments of the disclosure, the distortion parameter may be determined based on a distance between the first block and the center of the image circle.

According to various embodiments of the disclosure, the distortion parameter may be used to change a curvature of a prediction direction used for the intra-prediction.

According to various embodiments of the disclosure, the lens unit may include a lens having a field of view of 120 degrees or greater.

According to various embodiments of the disclosure, the electronic device may further include a communication module configured to transmit the compressed image to an external electronic device.

According to various embodiments of the disclosure, the electronic device may be configured to receive, using the communication module, an image generated by the external electronic device performing image processing on the compressed image.

Figure 6:
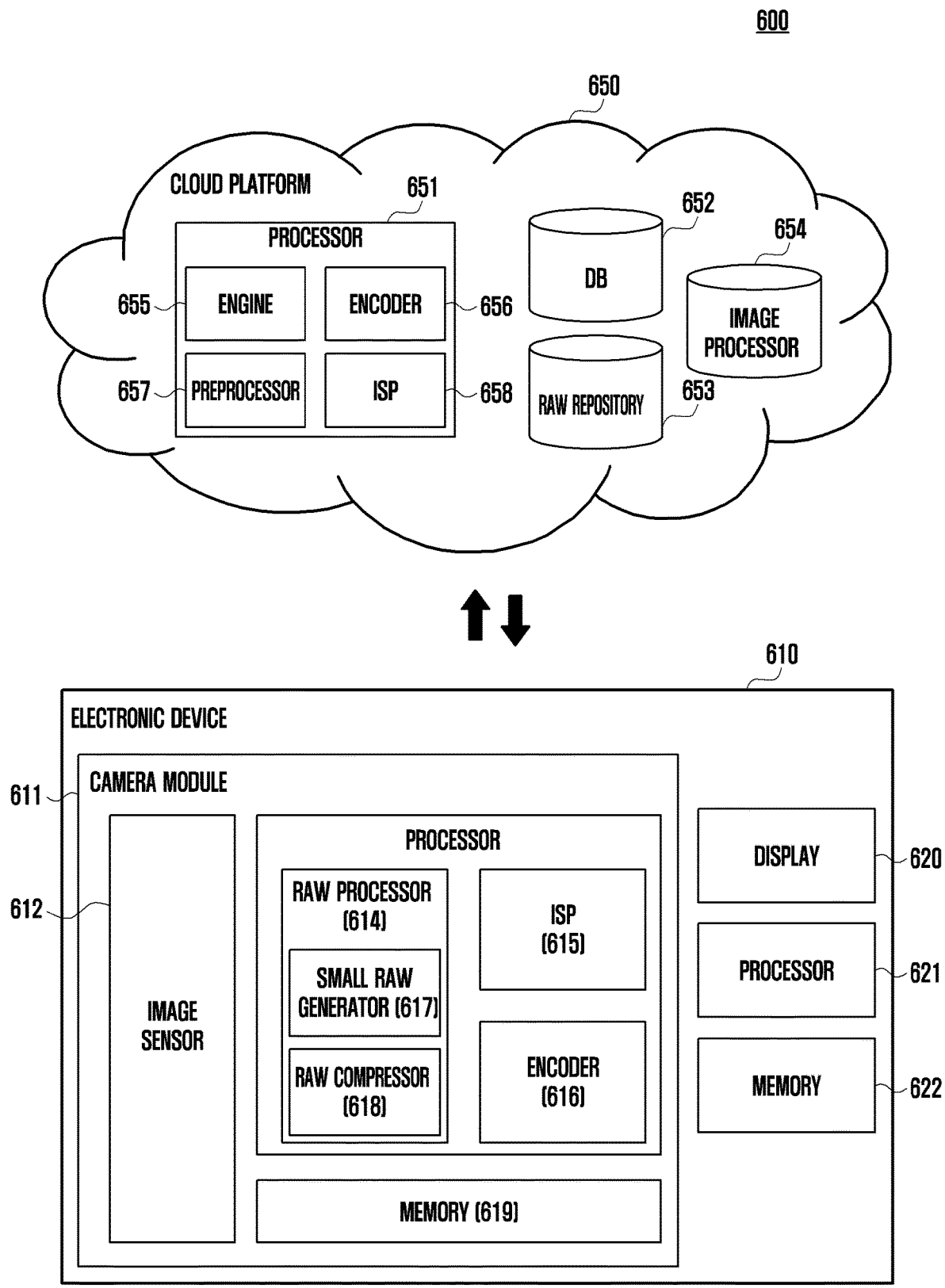
FIG. 6 is a block diagram illustrating an electronic device and a cloud platform according to various embodiments of the disclosure.

FIG. 6 is a block diagram illustrating an electronic device and a cloud platform according to various embodiments of the disclosure.

Referring to FIG. 6, the electronic device 610 (e.g., the electronic device 300 of FIG. 3) may include a camera module 611 (e.g., the camera module 310 of FIG. 3), a display 620 (e.g., the display device 160 of FIG. 1), a processor 621 (e.g., the processor 320 of FIG. 3), and memories 619 and 622 (e.g., the memory 330 of FIG. 3).

According to various embodiments of the disclosure, the camera module 611 may include an image sensor 612 (e.g., the image sensor 313 in FIG. 3), a processor 613, and a memory 619. The processor 613 may include a raw image processor 614, an image signal processor 615, and an encoder 616.

According to various embodiments of the disclosure, the image sensor 612 may obtain various raw images of a subject. The image sensor 612 may obtain various types of raw images according to a color filter array (CFA) pattern. When a dual pixel (DP or 2PD) structure of the image sensor 612 is used, an image including different pieces of phase difference (or parallax) information for one pixel may be obtained. When a plurality of image sensors having the same or different characteristics (e.g. a dual sensor (e.g. RGB+RGB, RGB+Mono, or Wide+Tele) and an array sensor (e.g. with two or more sensors attached)) is used, one or more image sensors 612 may be obtained for one scene. The obtained image sensors 612 may be stored in the memory 622 as it is or via additional processing.

According to various embodiments of the disclosure, the image sensor 612 may obtain an image corresponding to the subject by converting light transmitted from the subject through a lens assembly (not shown) into an electrical signal. According to an embodiment, the image sensor 612 may include, for example, one image sensor selected from among image sensors having different properties, such as an RGB sensor, a black and white (BW) sensor, an IR sensor, or a UV sensor, a plurality of image sensors having the same properties, or a plurality of image sensors having different properties. Each image sensor included in the image sensor 612 may be configured, for example, as a charge-coupled device (CCD) sensor or a complementary metal-oxide semiconductor (CMOS) sensor.

According to various embodiments of the disclosure, the camera module 611 may further include the lens assembly (e.g., the lens assembly 210 of FIG. 2), a flash (e.g., the flash 220 of FIG. 2), and an image stabilizer (e.g., the image stabilizer 240 of FIG. 2).

According to various embodiments of the disclosure, the lens assembly 210 may collect light emitted from the subject to be photographed. The lens assembly 210 may include one or more lenses.

According to various embodiments of the disclosure, the camera module 611 may include a plurality of lens assemblies 210. In this case, the camera module 611 may be, for example, a dual camera, a 360-degree camera, or a spherical camera. The plurality of lens assemblies (not shown) may have the same lens properties (e.g., field of view, focal length, autofocus, f number, or optical zoom), or at least one lens assembly may have at least one different lens property from another lens assembly. The lens assemblies (not shown) may include, for example, a wide-angle lens or a telephoto lens. The flash 210 may emit a light source used to intensify light emitted from the subject. The flash 220 may include one or more light-emitting diodes (e.g., a red-green-blue (RGB) LED, a white LED, an infrared LED, or an ultraviolet LED) or a xenon lamp.

According to various embodiments of the disclosure, in reaction to a movement of the camera module 612 or the electronic device 610 including the camera module 612, the image stabilizer 240 may move or control (e.g., adjust read-out timing) at least one lens included in the lens assembly (not shown) or the image sensor 612 in a specific direction in order to at least partly compensate for a negative effect (e.g., image shaking) of the movement on a captured image. According to an embodiment, the image stabilizer 240 may be configured, for example, as an optical image stabilizer and may detect the movement using a gyro sensor (not shown) or an acceleration sensor (not shown) disposed inside or outside the camera module 212.

According to various embodiments of the disclosure, the processors 613 and 621 of the electronic device may perform various types of processing related to image processing. Various image processing modules (e.g., the raw image processor 614, the image signal processor 615, and the encoder 616) may be included in one processor or may be distributed in a plurality of processors 613 and 621. The processor 613 may be present inside the camera module 611, outside the camera module 611 (e.g., in the electronic device 610 or one or a plurality of servers forming part of the cloud platform 650), or both inside and outside the camera module 611. Various types of processing may be performed alone by a processor or may be performed in a distributed manner by a plurality of processors.

According to various embodiments of the disclosure, the raw image processor 614 may perform various types of processing on a raw image obtained by the image sensor 612. The raw image processor 614 may compensate for lens distortion of the raw image or may partially remove noise from the raw image. Since the raw image may have a significantly large data size, the raw image processor 614 may reduce the data size through various types of processing (e.g., downscaling, downsampling, or compression) before storing, processing, or transmitting the raw image.

According to various embodiments of the disclosure, a small raw image generator 617 may perform downscaling (e.g., an operation of reducing the size or the resolution) or downsampling (e.g., an operation of taking only one or only some of a series of sampled samples) on the raw image, thereby generating a small raw image.

According to various embodiments of the disclosure, a raw image compressor 618 may compress the raw image or the small raw image using various image compression algorithms. As described with reference to FIG. 5A to FIG. 5H, the raw image compressor 618 may compress the raw image or the small original image using a plurality of direction modes configured in view of the degree of distortion of the raw image.

According to various embodiments of the disclosure, the image signal processor 615 performs various types of image processing on the raw image using recipe information including various pieces of information about the raw image analyzed by an engine 657. The electronic device 610 may receive the recipe information from the cloud platform 650 and may process the raw image based on the recipe information through the image signal processor 615. For example, the electronic device 610 may perform image processing provided from an embedded image signal processor of the electronic device 610 and image processing using the recipe information in combination. When image processing is performed in the cloud platform 650, the cloud platform 650 may process the raw image based on the recipe information through an image signal processor 658 included in the cloud platform 650. The image signal processor 658 included in the cloud platform 650 may receive additional information (e.g., a feature vector) corresponding to the recipe information from a database 652 and may use the additional information for image processing. The processed image may be transmitted to the electronic device 610 or may be stored in an image repository 654 of the cloud platform 650. Image processing may include white balance, color adjustment, noise reduction, sharpening, and detail enhancement functions. These functions may be performed for each image area based on the recipe information.

According to various embodiments of the disclosure, the image signal processor 615 may perform image processing (e.g., depth map generation, 3D modeling, panorama generation, feature point extraction, image synthesis, or image compensation (e.g. noise reduction, resolution adjustment, brightness adjustment, blurring, sharpening, or softening) on an image obtained by the image sensor 612 or an image stored in the memories 619 and 622. Additionally or alternatively, the image signal processor 615 may control (e.g., exposure time control or read-out timing control) at least one (e.g., the image sensor 612) of components included in the camera module 611. An image processed by the image signal processor 615 may be stored back in the memory 650 for further processing or may be transmitted to a component (e.g., the memory 130, the display device 160, the electronic device 102, the electronic device 104, or the server 108) outside the camera module 180. According to an embodiment, the image signal processor 615 may be configured as at least part of the processors 613 and 621 or may be configured as a separate processor that operates independently of the processors 613 and 621. When the image signal processor 615 is configured as a separate processor, images processed by the image signal processor 615 may be displayed on the display 620 by the processors 613 and 621 as they are or via additional image processing According to various embodiments of the disclosure, the encoder 616 may encode a raw image, thereby generating an image file (e.g., a JPEG, MPEG, or 360-degree image).

According to various embodiments of the disclosure, the electronic device 610 may include the memory 619 inside the camera module 611 and/or the memory 622 outside the camera module 611. The memories 619 and 622 may store a raw image, a small raw image, an image file, and an image-processed raw image. The memories 619 and 622 may at least temporarily store at least a portion of an image obtained by the image sensor 612 for a subsequent image processing operation. For example, when there is a delay in obtaining an image due to a shutter or when a plurality of images is obtained at high speed, an obtained original image (e.g., a high-resolution image) may be stored in the memories 619 and 622 and a corresponding duplicate image (e.g., a low-resolution image) may be previewed on the display 620. Subsequently, when a specified condition is satisfied (e.g., according to a user input or a system command), at least a portion of the original image stored in the memories 619 and 622 may be obtained and processed, for example, by the image signal processor 615. According to an embodiment, the memory 619 may be configured as at least part of the memory 622 or as a separate memory operating independently of the memory 622.

According to various embodiments of the disclosure, the electronic device 610 may include the display 622.

According to various embodiments of the disclosure, the cloud platform 650 is an external device and may include a processor 651, the database 652, a raw image repository 653, and the image repository 654. The processor 651 may include the engine (e.g., a recognition engine) 655, an encoder 656, a preprocessor 657, and the image signal processor 658.

According to various embodiments of the disclosure, the processor 651 of the cloud platform 650 may perform various types of processing related to image processing. Various image processing modules (e.g., the engine 655, the encoder 656, the preprocessor 657, and the image signal processor 658) may be included in one processor or may be distributed in a plurality of processors.

According to various embodiments of the disclosure, the engine 655 may analyze various pieces of significant information (e.g., object recognition, a velocity vector, face recognition, segmentation, scene parsing, and the like) from an image (e.g., a raw image, a small raw image, an image file, or the like). To this end, the engine 655 may include various algorithms. As a result of the analysis, information (recipe information, e.g., information including segments, layers, vectors, or scene categories) that can be used by the image signal processor for various types of image processing may be generated, stored, or transmitted in association with the image.

According to various embodiments of the disclosure, the encoder 656 may encode a raw image, thereby generating an image file (e.g., a JPEG, MPEG, or 360-degree image).

According to various embodiments of the disclosure, the preprocessor 657 may perform necessary processing a raw image received from the electronic device 610 before transferring the raw image to the engine 655 or the image signal processor 658. The preprocessor 657 may perform decompression of a compressed raw image, simple image quality enhancement, de-mosaic processing, or image format change.

According to various embodiments of the disclosure, the image signal processor 658 performs various types of image processing on the raw image using recipe information including various pieces of information about a raw image analyzed by an engine 657. The electronic device 610 may receive the recipe information from the cloud platform 650 and may process the raw image based on the recipe information through the image signal processor 615. For example, the electronic device 610 may perform image processing provided from an embedded image signal processor of the electronic device 610 and image processing using the recipe information in combination. When image processing is performed in the cloud platform 650, the cloud platform 650 may process the raw image based on the recipe information through an image signal processor 658 included in the cloud platform 650. The image signal processor 658 included in the cloud platform 650 may receive additional information (e.g., a feature vector) corresponding to the recipe information from a database 652 and may use the additional information for image processing. The processed image may be transmitted to the electronic device 610 or may be stored in an image repository 654 of the cloud platform 650. Image processing may include white balance, color adjustment, noise reduction, sharpening, and detail enhancement functions. These functions may be performed for each image area based on the recipe information.

According to various embodiments of the disclosure, the database 652 may store a feature corresponding to a category of an image. The raw image repository 653 may store a raw image. The image repository 654 may store an image file.

Figure 7:
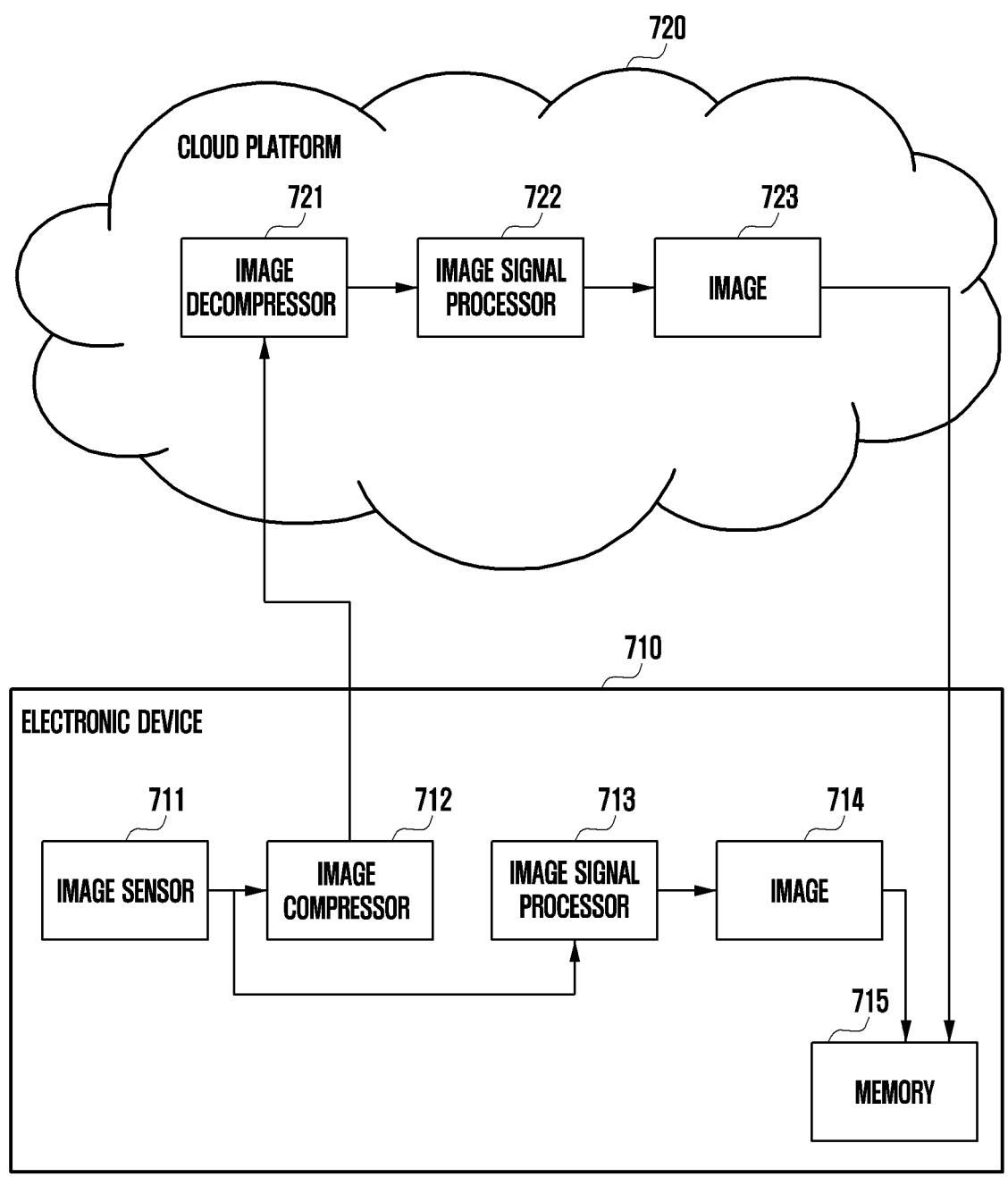
FIG. 7 illustrates a process in which an electronic device compresses an obtained image according to various embodiments of the disclosure.

FIG. 7 illustrates a process in which an electronic device 710 processes an obtained image using a cloud platform 720 or the electronic device 710 according to various embodiments of the disclosure.

According to various embodiments of the disclosure, an image sensor 711 (e.g., the image sensor 313 of FIG. 3) may convert light collected by a lens unit 311 into an electrical signal, thereby obtaining an image corresponding to an external object 350. The image generated by the image sensor 313 may be a raw image.

According to various embodiments of the disclosure, a raw image may refer to an image generated by the image sensor 313, which is an image that has not been subjected to image compression.

According to various embodiments of the disclosure, a raw image may be subjected to image processing in the electronic device 710 or the cloud platform 720. To this end, the raw image may be transmitted to the cloud platform 720 or an image signal processor 713 (e.g., the image signal processor 615 of FIG. 6). When the raw image is transmitted to the cloud platform 720, the electronic device 710 may transmit a compressed image obtained by compressing the raw image to the cloud platform 720 in order to reduce the size of data of the raw image.

According to various embodiments of the disclosure, an image decompressor 721 may decompress the compressed image. The decompressed image may be transmitted to an image signal processor 722 (e.g., the image signal processor 615 of FIG. 6). The image signal processor 615 may perform image processing (e.g., various image processing operations including depth map generation, 3D modeling, panorama generation, feature point extraction, image synthesis, or image compensation (e.g. noise reduction, resolution adjustment, brightness adjustment, blurring, sharpening, or softening) on the decompressed image, thereby generating a finally processed image 723. The processed image 723 may be transmitted to the electronic device 710 and may be stored in a memory 715 of the electronic device 710.

According to various embodiments of the disclosure, the raw image may be transmitted to the image signal processor 713, and the image signal processor 713 may perform image processing (e.g., various image processing operations including depth map generation, 3D modeling, panorama generation, feature point extraction, image synthesis, or image compensation (e.g. noise reduction, resolution adjustment, brightness adjustment, blurring, sharpening, or softening) on the raw image, thereby generating a finally processed image 714. The processed image 714 may be transmitted to the electronic device and may be stored in the memory 715 of the electronic device 710.

According to various embodiments of the disclosure, the raw image may be an image captured using at least two or more camera modules included in a 360-degree camera. In the case of an image captured by the 360-degree camera, the image signal processors 713 and 722 may perform warping (effect of distorting an image) and stitching (putting images together) on at least two or more images. The cloud platform 720 may have a higher image processing speed than the electronic device 710 and may quickly process an image captured by the 350-degree camera.

Figure 8:
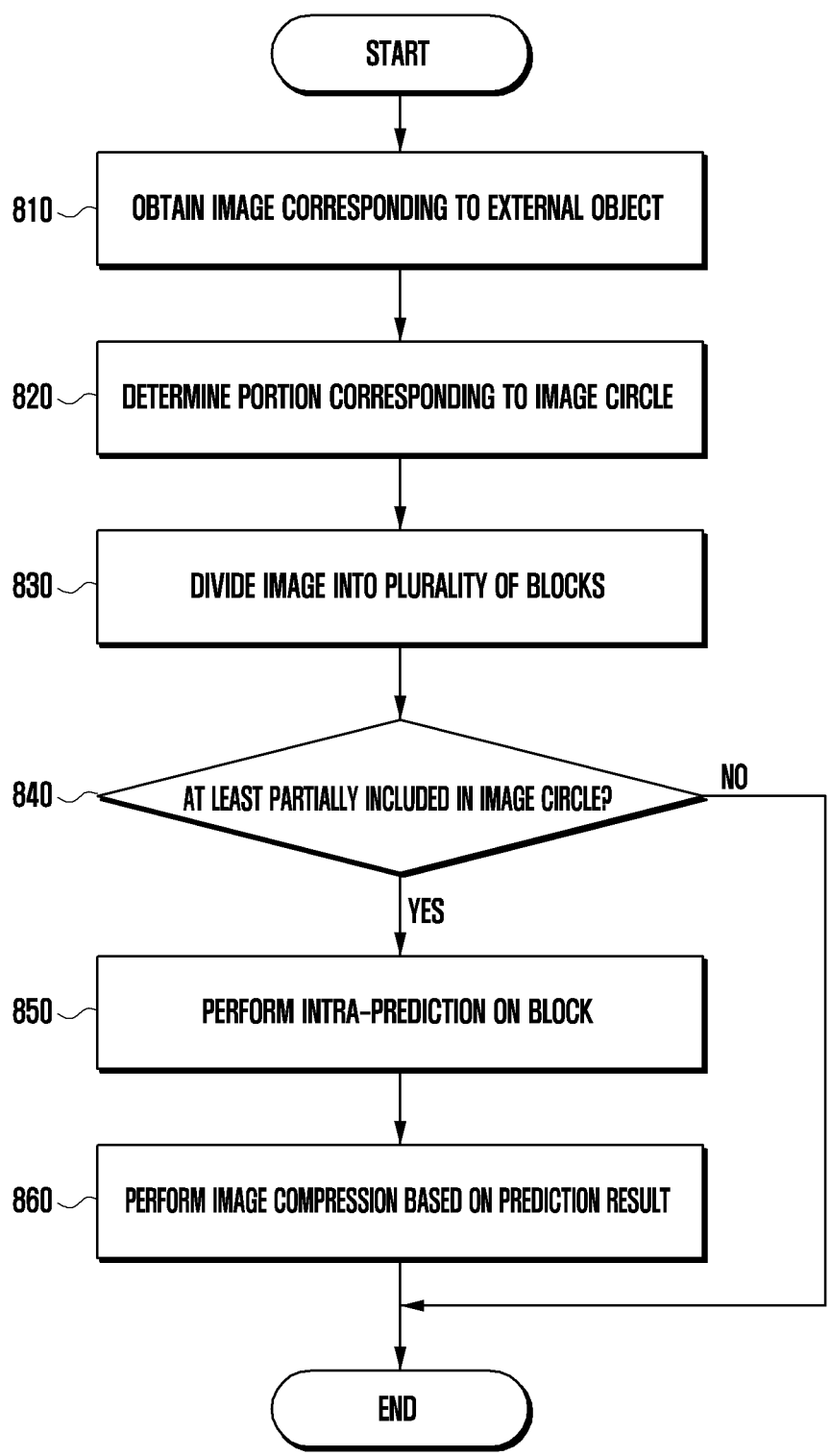
FIG. 8 is an operation flowchart illustrating an operating method of an electronic device according to various embodiments of the disclosure.

FIG. 8 is an operation flowchart illustrating an operating method of an electronic device according to various embodiments of the disclosure.

According to various embodiments of the disclosure, in operation 810, a processor (e.g., the processor 320 of FIG. 3) may obtain an image corresponding to an external object (e.g., the external object 350 of FIG. 3).

According to various embodiments of the disclosure, an image sensor (e.g., the image sensor 313 of FIG. 3) may convert light collected by a lens unit (e.g., the lens unit 311 of FIG. 3) into an electrical signal, thereby obtaining an image corresponding to the external object 350. The image generated by the image sensor 313 may be a raw image. The processor 320 may obtain the raw image obtained by the image sensor 313.

According to various embodiments of the disclosure, in operation 820, the processor 320 may determine a portion corresponding to an image circle.

According to various embodiments of the disclosure, the image circle may refer to a shape formed on the surface of the image sensor 313 when light corresponding to the external object 350 passes through the lens unit 311. The image circle may have a circular shape but may have various shapes without being limited to a circular shape.

According to various embodiments of the disclosure, in operation 830, the processor 320 may divide the image into a plurality of blocks.

According to various embodiments of the disclosure, the plurality of blocks may refer to a minimum unit for the processor 320 to perform intra-prediction or inter-prediction.

According to various embodiments of the disclosure, in operation 840, the processor 320 may determine whether each of the plurality of blocks is at least partially included in the image circle.

According to various embodiments of the disclosure, the processor 320 may determine to compress blocks at least partially included in the image circle among the plurality of blocks. The processor 320 may determine not to compress blocks not included in the image circle among the plurality of blocks.

According to various embodiments of the disclosure, in operation 850, the processor 320 may perform intra-prediction on the blocks at least partially included in the image circle.

According to various embodiments of the disclosure, the processor 320 may perform the intra-prediction using a direction mode determined based on a distortion parameter corresponding to a block. Lines included in the direction mode may have curvature determined based on the degree of distortion. The curvature may be determined based on a distortion parameter of the raw image generated due to optical characteristics of the lens unit 311.

According to various embodiments of the disclosure, in operation 860, the processor 320 may compress the image based on an intra-prediction result.

According to various embodiments of the disclosure, the processor 320 may transmit a compressed image generated by compressing the image to a cloud platform (e.g., the cloud platform 720 of FIG. 7) using a communication module (e.g., the communication module 190 of FIG. 1).

Figure 9:
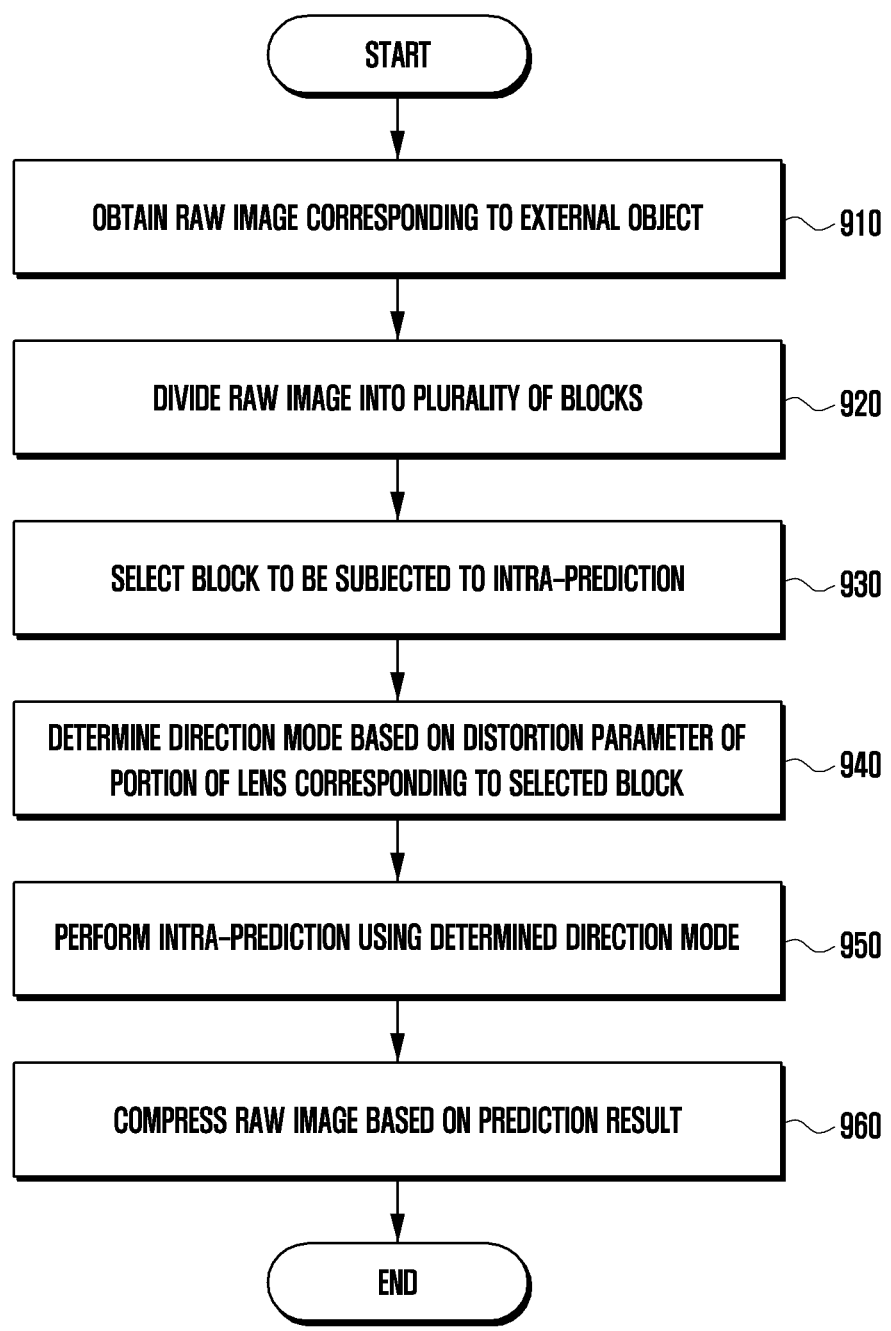
FIG. 9 is an operation flowchart illustrating an operating method of an electronic device according to other embodiments of the disclosure.

FIG. 9 is an operation flowchart illustrating an operating method of an electronic device according to other embodiments of the disclosure.

According to various embodiments of the disclosure, in operation 910, a processor (e.g., the processor 320 of FIG. 3) may obtain a raw image corresponding to an external object (e.g., the external object 350 of FIG. 3).

According to various embodiments of the disclosure, an image sensor (e.g., the image sensor 313 of FIG. 3) may convert light collected by a lens unit (e.g., the lens unit 311 of FIG. 3) into an electrical signal, thereby obtaining an image corresponding to the external object 350. The image generated by the image sensor 313 may be a raw image. The processor 320 may obtain the raw image obtained by the image sensor 313.

According to various embodiments of the disclosure, in operation 920, the processor 320 may divide the raw image into a plurality of blocks.

According to various embodiments of the disclosure, the plurality of blocks may refer to a minimum unit for the processor 320 to perform intra-prediction or inter-prediction.

In operation 930, the processor 320 may select a block to be subjected to intra-prediction from among the plurality of blocks.

In operation 940, the processor 320 may determine a direction mode based on a distortion parameter of a portion of a lens corresponding to the selected block.

According to various embodiments of the disclosure, the processor 320 may identify a distortion parameter of a portion of the lens unit 311 corresponding to the selected block. The processor 320 may determine a direction mode corresponding to the identified distortion parameter and may perform intra-prediction on the selected block using the determined direction mode.

According to various embodiments of the disclosure, direction modes respectively mapped to a plurality of distortion parameters may be stored in a memory (e.g., the memory 330 of FIG. 3) of the electronic device 300. The direction modes may include lines having different curvatures according to the degree of distortion indicated by the distortion parameters. For example, lines included in a direction mode used for intra-prediction of a block having a large degree of distortion may have a greater curvature than lines included in another direction mode. Curvature may be determined based on a distortion parameter generated due to optical characteristics of the lens unit 311.

In operation 950, the processor 320 may perform the intra-prediction using the determined direction mode.

According to various embodiments of the disclosure, when performing the intra-prediction on the block, the processor 320 may perform the intra-prediction according to directions (directional modes) indicated by a plurality of curved lines included in the determined direction mode and may select a directional mode in which a residual value is the smallest.

In operation 960, the processor 320 may compress the raw image based on a prediction result.

According to various embodiments of the disclosure, the processor 320 may perform intra-compression of the raw image using the directional mode in which the residual value is the smallest. The processor 320 may compress the raw image by performing operation 930, operation 940, and operation 950 on the plurality of blocks included in the raw image.

According to various embodiments of the disclosure, the processor 320 may perform the intra-prediction in view of the degree of distortion of the block selected to be subjected intra-prediction, thereby generating a compressed image having a small residual value and increasing compression efficiency.

According to various embodiments of the disclosure, the processor 320 may transmit a compressed image generated by compressing the image to a cloud platform (e.g., the cloud platform 720 of FIG. 7) using a communication module (e.g., the communication module 190 of FIG. 1).

An operating method of an electronic device according to various embodiments of the disclosure may include: obtaining a raw image corresponding to an external object using an image sensor; dividing the raw image into a plurality of blocks; selecting a block to be subjected to intra-prediction from among the plurality of blocks; determining a direction mode to be used for intra-prediction of the selected block based on a distortion parameter of a portion of a lens unit corresponding to the selected block; performing the intra-prediction on the selected block based on the determined direction mode; and generating a compressed image corresponding to the raw image based on a result of the intra-prediction.

In the operating method of the electronic device according to various embodiments, the determining of the direction mode may include: determining the portion of the lens unit corresponding to the selected block based on information about a relative position between the selected block and a center of the raw image; and selecting a direction mode corresponding to the determined portion.

In the operating method of the electronic device according to various embodiments, the performing of the intra-prediction on the selected block may include selecting one direction from among a plurality of directions included in the selected direction mode based on a difference between a pixel value corresponding to a base pixel among pixels included in the selected block and a pixel value corresponding to a reference pixel present around the base pixel.

In the operating method of the electronic device according to various embodiments, the direction mode may be configured such that a curvature of a line included in the direction mode varies depending on the distortion parameter.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
    a lens unit;
    an image sensor;
    a memory configured to store a direction mode used for intra-prediction of an image captured using the image sensor and differently configured depending on a characteristic of a portion of the lens unit; and
    a processor, wherein the processor is configured to:
    obtain a raw image corresponding to an external object using the image sensor;
    divide the raw image into a plurality of blocks;
    select a block to be subjected to intra-prediction from among the plurality of blocks;
    determine a direction mode to be used for intra-prediction of the selected block based on a distortion parameter of a portion of the lens unit corresponding to the selected block;
    perform the intra-prediction on the selected block based on the determined direction mode; and
    generate a compressed image corresponding to the raw image based on a result of the intra-prediction, and
    wherein the direction mode is configured such that a curvature of a line included in the direction mode varies depending on a distance between a center of the lens unit and a center of the portion of the lens unit.

2. The electronic device of claim 1, wherein the processor is configured to:
    determine the portion of the lens unit corresponding to the selected block based on information about a relative position between the selected block and a center of the raw image;
    select a direction mode corresponding to the determined portion; and
    perform the intra-prediction on the selected block based on the selected direction mode.

3. The electronic device of claim 1, wherein the processor is configured to:
    select one direction from among a plurality of directions included in the determined direction mode based on a difference between a pixel value corresponding to a base pixel among pixels included in the selected block and a pixel value corresponding to a reference pixel present around the base pixel; and
    perform the intra-prediction on the selected block using the selected direction.

4. The electronic device of claim 1, wherein the direction mode is configured such that a curvature of a line included in the direction mode varies depending on the distortion parameter.

5. The electronic device of claim 1, wherein the lens unit comprises a telephoto lens, and
    a curvature of a line included in the direction mode is configured to increase when a distance between a center of the lens unit and a center of the portion of the lens unit increases.

6. The electronic device of claim 1, further comprising:
    a communication module configured to transmit the compressed image to an external electronic device,
    wherein the electronic device is configured to receive, using the communication module, an image generated by the external electronic device that performs image processing on the compressed image.

7. An electronic device comprising:
    a lens unit;
    an image sensor configured to be disposed such that an image circle, formed on a surface of the image sensor when light corresponding to an external object passes through the lens unit, partially comprises a portion of the image sensor and does not comprise another portion of the image sensor; and
    a processor, wherein the processor is configured to:
    obtain an image corresponding to the external object using the image sensor;
    determine a portion of the image corresponding to the image circle;
    generate compressed image data by dividing the image into a plurality of blocks and compressing the plurality of blocks, a block at least partially included in the image circle among the plurality of blocks being compressed as part of the compressed image data and a block not included in the image circle among the plurality of blocks not being included in the compressed image data in part of the compressing; and
    transmit the compressed image data to an external processor, wherein the processor is further configured to:
    determine a distortion parameter based on a first block at least partially included in the image circle and a center of the image circle;
    determine a direction mode to be used for intra-prediction of the first block based on the distortion parameter; and
    perform the intra-prediction on the first block based on the determined direction mode, wherein the direction mode is configured such that a curvature of a line included in the direction mode varies depending on a distance between a center of the lens unit and a center of the portion of the lens unit.

8. The electronic device of claim 7, wherein the processor is configured to perform the intra-prediction using a specified intra-prediction angular mode and the distortion parameter.

9. The electronic device of claim 7, wherein the processor is configured to determine the distortion parameter based on an angle formed between at least two apexes of the first block and the center.

10. The electronic device of claim 7, wherein the distortion parameter is determined based on a distance between the first block and the center of the image circle.

11. The electronic device of claim 10, wherein the distortion parameter is used to change a curvature of a prediction direction used for the intra-prediction.

12. The electronic device of claim 7, wherein the lens unit comprises a lens having a field of view of 120 degrees or greater.

13. The electronic device of claim 7, further comprising a communication module configured to transmit the compressed image to an external electronic device.

* * * * *